(12) United States Patent
Nakagawa et al.

(10) Patent No.: US 10,049,832 B2
(45) Date of Patent: Aug. 14, 2018

(54) DISPLACEMENT SWITCH CONFIGURATIONS, AND OPERATION DEVICE HAVING THE DISPLACEMENT SWITCH

(71) Applicant: KUBOTA CORPORATION, Osaka-shi (JP)

(72) Inventors: Hiroaki Nakagawa, Sakai (JP); Masahiro Kuroda, Sakai (JP); Keisuke Miura, Sakai (JP); Ikuhiro Uotani, Sakai (JP); Satoshi Tajima, Sakai (JP); Hiroyuki Anami, Sakai (JP); Hayato Kawano, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/183,801

(22) Filed: Jun. 16, 2016

(65) Prior Publication Data
US 2017/0029007 A1 Feb. 2, 2017

(30) Foreign Application Priority Data

Jul. 31, 2015 (JP) ................................ 2015-152652
Jul. 31, 2015 (JP) ................................ 2015-152653
Jul. 31, 2015 (JP) ................................ 2015-152654
Jul. 31, 2015 (JP) ................................ 2015-152655
Jul. 31, 2015 (JP) ................................ 2015-152656

(51) Int. Cl.
H01H 25/00 (2006.01)
G05G 1/06 (2006.01)
B62D 1/12 (2006.01)
H01H 13/14 (2006.01)
H01H 25/04 (2006.01)

(52) U.S. Cl.
CPC .............. H01H 13/14 (2013.01); B62D 1/12 (2013.01); H01H 25/041 (2013.01); G05G 1/06 (2013.01); H01H 25/00 (2013.01)

(58) Field of Classification Search
CPC ..... G05G 2009/04774; G05G 9/04785; G05G 1/00; G05G 1/06; Y10T 74/2003; Y10T 74/20159; Y10T 74/20612; B62D 1/12; H01H 25/00; H01H 25/041
USPC ..... 200/6 A, 293.1, 332.2; 180/315; 74/523, 74/469; 345/161; D14/415, 416
See application file for complete search history.

(56) References Cited

U.S. PATENT DOCUMENTS 4,006,334 A * 2/1977 Robotham ............... H01H 3/20
200/321
2010/0050803 A1* 3/2010 Stamate ................ E02F 9/2004
74/471 XY
2013/0333510 A1* 12/2013 Paakkinen ............... G05G 1/01
74/490.12

FOREIGN PATENT DOCUMENTS

JP          5140023 B2    9/2010

* cited by examiner

Primary Examiner — Vanessa Girardi
(74) Attorney, Agent, or Firm — Mori & Ward, LLP

(57) ABSTRACT

A displacement switch includes a main operation portion having a hollow shape. The main operation portion includes a top surface via which the displacement switch is operated, and a side surface connected to the top surface to define the hollow shape. The displacement switch also includes a support member connected to the main operation portion and swingable around a swing axis together with the main operation portion, and a base including a peripheral wall surrounding an insertion inlet into which the support member is inserted. The main operation portion covers the (Continued)

insertion inlet such that the side surface surrounds an outer peripheral surface of the peripheral wall.

19 Claims, 21 Drawing Sheets

DISPLACEMENT SWITCH CONFIGURATIONS, AND OPERATION DEVICE HAVING THE DISPLACEMENT SWITCH

CROSS-REFERENCE TO RELATED APPLICATIONS

The present application claims priority under 35 U.S.C. § 119 to Japanese Patent Application No. 2015-152656, filed Jul. 31, 2015, to Japanese Patent Application No. 2015-152652, filed Jul. 31, 2015, to Japanese Patent Application No. 2015-152654, filed Jul. 31, 2015, to Japanese Patent Application No. 2015-152655, filed Jul. 31, 2015, and to Japanese Patent Application No. 2015-152653, filed Jul. 31, 2015. The contents of these applications are incorporated herein by reference in their entirety.

BACKGROUND OF THE INVENTION

Field of the Invention

The present invention relates to an operation device, a displacement switch, and to an operation device having the displacement switch.

Discussion of the Background

Various types of levers have been developed for a work machine. Japanese Patent Publication No. 5,140,023, for example, discloses that an operation lever includes, on an upper surface of a grip portion, a rocker switch, an analog switch for attachments, and a shift-hold switch. The operation lever additionally has a configuration including a partition to separate a plurality of switches.

SUMMARY OF THE INVENTION

According to one aspect of the present invention, a displacement switch includes a first wall, a second wall, a third wall, a fourth wall, a support member, and a base. The first wall is disposed on a first side in a width direction and includes a first standing portion. The second wall is disposed on a second side opposite to the first side in the width direction and includes a second standing portion. The third wall connects the first standing portion and the second standing portion. The fourth wall includes an operation surface and connects the first wall, the second wall and the third wall. The support member is swingably disposed on at least one of the first wall, the second wall, the third wall and the fourth wall. The base overlaps the third wall viewed in a first direction perpendicular to the third wall. The base includes an insertion inlet into which the support member is inserted.

According to another aspect of the present invention, an operation device includes a grip portion, a head portion, a displacement switch. The head portion is disposed on the grip portion. The displacement switch is disposed on the head portion. The displacement switch is swingable about a vertical axis or slidable in a width direction. The displacement switch includes a main operation portion and a subordinate operation portion. The main operation portion extends along the width direction. The subordinate operation portion extends from the main operation portion along a direction perpendicular to the width direction.

According to still another aspect of the present invention, an operation device includes a grip portion, a head portion, a displacement switch, a support member, and a base. The head portion is disposed on the grip portion. The displacement switch is disposed on the head portion. The displacement switch is swingable about a vertical axis or slidable in a width direction. The displacement switch includes a first wall, a second wall, a third wall, and a fourth wall. The first wall is disposed on a first side in the width direction and includes a first standing portion. The second wall is disposed on a second side opposite to the first side in the width direction and includes a second standing portion. The third wall connects the first standing portion and the second standing portion. The fourth wall includes an operation surface and connects the first wall, the second wall and the third wall. The support member is swingably disposed on at least one of the first wall, the second wall, the third wall and the fourth wall. The base overlaps the third wall viewed in a first direction perpendicular to the third wall. The base includes an insertion inlet into which the support member is inserted.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
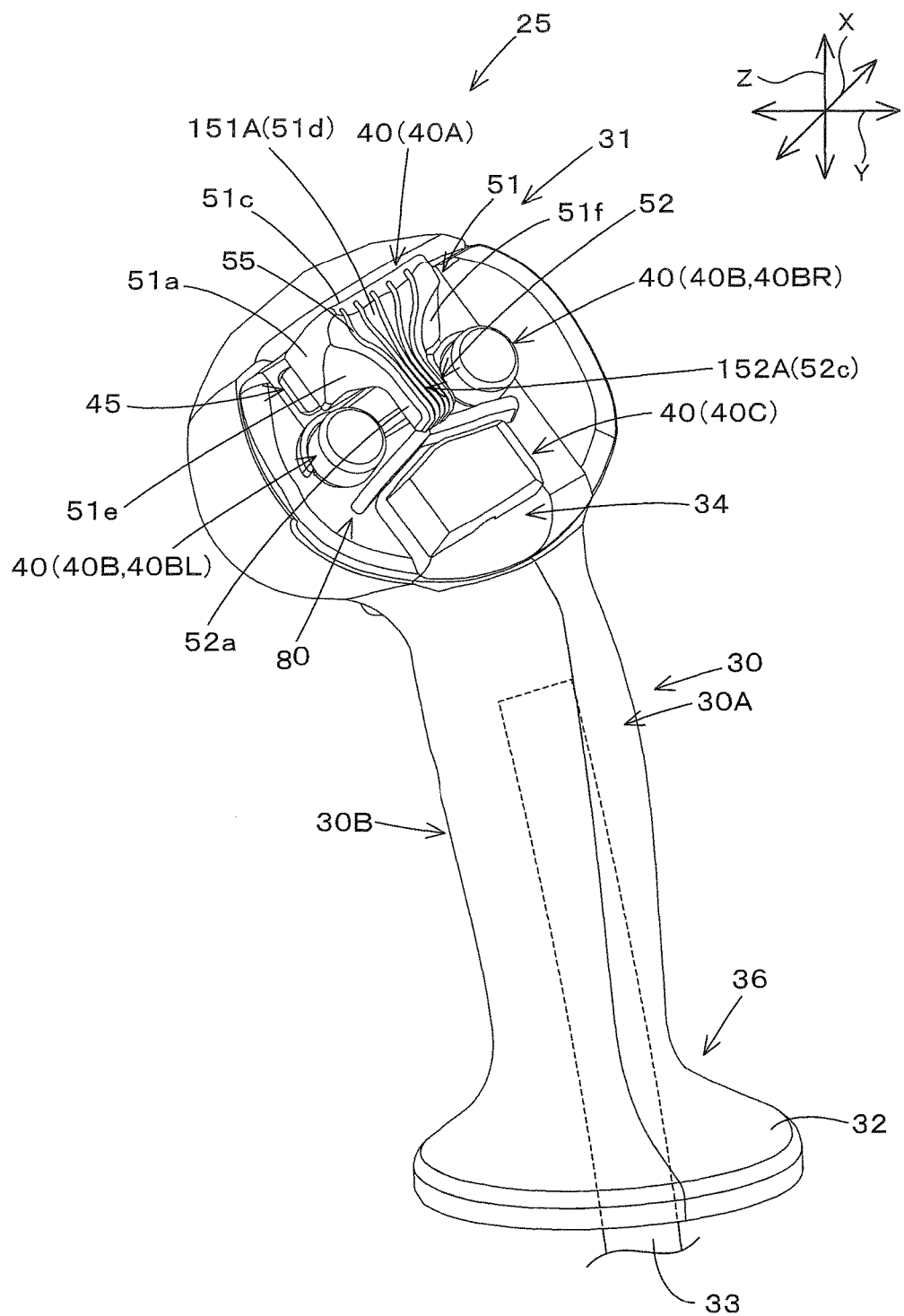
FIG. 1 is a perspective view of an operation device according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

First Embodiment

Figure 20:
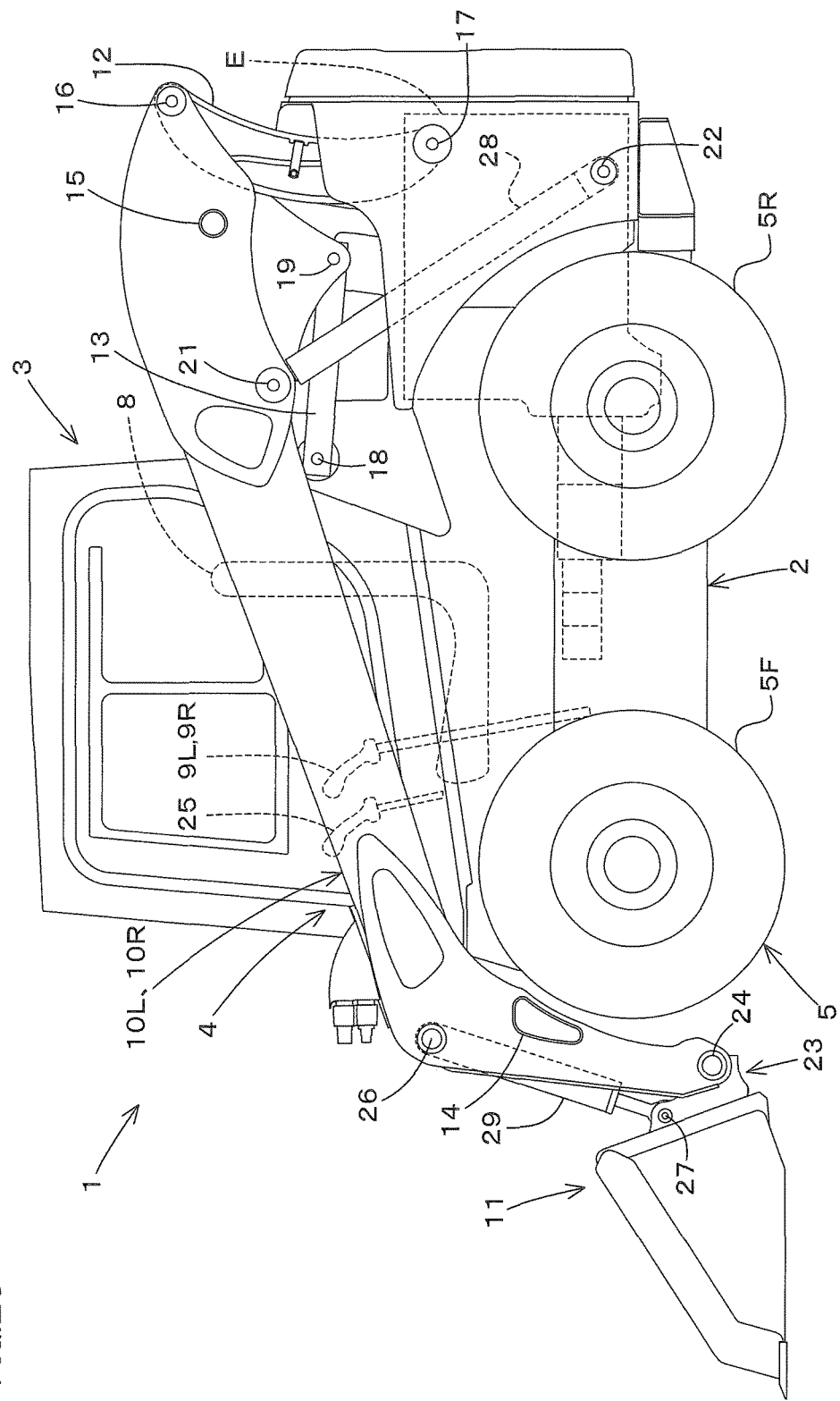
FIG. 20 is an overall view of a skid steer loader according to the embodiments.

FIG. 20 is an overall view of a Skid Steer Loader (SSL) having an operation device according a first embodiment of the present invention. In the embodiment, the Skid Steer Loader (SSL) is exemplified as a working machine having the operation device. However, the working machine according to the embodiment is not limited to the Skid Steer Loader (SSL), and can be other types of the working machine, for example, a Track Loader (TL), a Compact Track Loader (CTL), a Wheel Loader (WL) and a Back Hoe (BH).

In the following description, the description is made on the basis of a direction seeing a front of an operation device described below. An inward direction along a width direction (hereinafter referred to as an inward width direction) is a direction toward a center of a body of an operator from an outside on the basis of the operator operating the operation device. An outward direction along the width direction (hereinafter referred to as an outward width direction) is a direction toward the outside of the body of the operator. For the operation device for a right hand, a side of the right hand of the operator corresponds to the outward width direction, and a side of the left hand of the operator corresponds to the inward width direction. On the other hand, for the operation device for a left hand, the side of the right hand of the operator corresponds to the inward width direction, and the side of the left hand of the operator corresponds to the outward width direction. In other words, under a state where the operation device is attached to a machine frame 2, a side close to a center of the machine frame 2 in the width direction corresponds to the inward width direction and a side far from the center of the machine frame 2 in the width direction corresponds to the outward width direction. In addition, a side close to the body referred to as a near side and a side far from the body referred to as a far side. Moreover, a wall described below is not necessarily required to stand up, and may be horizontal (lateral) and obliquely inclined. A shape of the wall is not limited to any shape, and the wall may have, for example, a flat plate shape, a circular arc shape and a complex shape having a convex portion and a concave portion.

As shown in FIG. 20, the skid steer loader 1 has the machine frame (a vehicle frame) 2, a cabin 3 mounted on the machine frame 2, a work device 4 attached to the machine frame 2, a travel device 5 disposed on a right side of the machine frame 2, and another travel device 5 disposed on a left side of the machine frame 2.

An engine E is mounted on a rear portion on the machine frame 2. An operator seat 8 is provided in a room of the cabin 3. A pair of a left travel lever 9L (a travel lever 9L) and a right travel lever 9R (a travel lever 9R) is provided in front of the operator seat 8, the left travel lever 9L and the right travel lever 9R each being used for operation of the travel devices 5. The travel lever 9L disposed on the left side of the operator seat 8 is a member used for operation of the travel device 5 disposed on the left side of the machine frame 2. The travel lever 9R disposed on the right side of the operator seat 8 is a member used for operation of the travel device 5 disposed on the right side of the machine frame 2. In addition, an operation device 25 is disposed around the operator seat 8, for example, in the outward width direction to the operator seat 8 in the room of the cabin 3.

The work unit 4 has a right boom 10R disposed on the right side, a left boom 10L disposed on the left side, a bucket 11 serving as a work tool. The right boom 10R is arranged on the right sides of the cabin 3 and the machine frame 2. And, the left boom 10L is arranged on the left sides of the cabin 3 and the machine frame 2. The bucket 11 is provided to tip sides (front end sides) of the right boom 10R and the left boom 10L, and is thereby capable of freely swinging upward and downward.

In addition, the work device 4 has a lift link 12, a control link 13, a boom cylinder 28 and a bucket cylinder 29. The lift link 12 and the control link 13 support base portion sides (rear portion sides) of the booms 10R and 10L. The boom cylinder 28 lifts and lowers the booms 10L and 10R. The bucket cylinder 29 swings the bucket 11. The boom cylinder 28 and the bucket cylinder 29 are each composed of a double-acting hydraulic cylinder.

The tip sides of the right boom 10R and the left boom 10L are connected each other with a front connection member 14 composed of a deformed pipe. The base portion sides of the right boom 10R and the left boom 10L are connected each other with a rear connection member 15 formed of a circular pipe. The lift link 12, the control link 13, and the boom cylinder 28 are provided, corresponding to the right boom 10R and the left boom 10L, to each of the right side and the left side of the machine frame 2.

The lift links 12 are arranged at rear end sides of the booms 10R and 10L. For example, the lift links 12 is disposed on a rear end side of the machine frame 2, that is, on an outward side of the machine frame 2 in the width direction. Upper end sides of the lift links 12 are pivotally supported via pivots 16 (hereinafter each referred to as a first pivot) by the rear end sides of the base portions of the booms 10R and 10L, thereby being freely rotatable centering around a horizontal axis extending along the right to left direction (or along the left to right direction). In addition, lower end sides of the lift links 12 are pivotally supported via pivots 17 (hereinafter each referred to as a second pivot) by an upper portion of the rear end side of the machine frame 2, thereby being freely rotatable centering around the horizontal axis extending along the right to left direction (or along the left to right direction).

The control links 13 are arranged in front of the lift links 12. Front end sides of the control links 13 are pivotally supported via pivots 18 (hereinafter each referred to as a third pivot) by the machine frame 2, thereby being freely rotatable centering around the horizontal axis extending along the right to left direction (or along the left to right direction). Rear end sides of the control links 13 are pivotally supported via pivots 19 (hereinafter each referred to as a fourth pivot) by lower end portions of intermediate portions of the booms 10R and 10L, the intermediate portions being on sides of the base portions of the booms 10R and 10L in the front to rear direction (the rear to front direction), thereby being freely rotatable centering around the horizontal axis extending along the right to left direction (or along the left to right direction).

Upper portions of the boom cylinders 28 are pivotally supported via first boom cylinder pins 21 by front portions of the booms 10R and 10L, the front portions being on sides of the base portions of the booms 10R and 10L, thereby being freely rotatable centering around the horizontal axis extending along the right to left direction (or along the left to right direction). Lower portions of the boom cylinders 28 are pivotally supported via second boom cylinder pins 21 by lower portions of the machine frame 2, thereby being freely rotatable centering around the horizontal axis extending along the right to left direction (or along the left to right direction). When the boom cylinders 28 are stretched and shortened, the tip sides (the bucket 11) of the booms 10R and 10L are lifted and lowered with the base portion sides of the booms 10R and 10L supported by the lift links 12 and the control links 13; in this manner, the booms 10R and 10L swing upward and downward centering around the first pivots 16.

The control links 13 swing upward and downward centering around the third pivots 18 in synchronization with the upward and downward swinging of the booms 10R and 10L. The lift links 12 swing forward and backward centering around the second pivots 17 in synchronization with the upward and downward swinging of the control links 13.

The bucket 11 is attached to an attachment 23 in a freely attachable and detachable manner, the attachment 23 being pivotally supported by the tip sides (the front end sides) of the right boom 10R and the left boom 10L. The attachment 23 is pivotally supported via a pivotally-supporting pin 24 by the tip sides of the right boom 10R and the left boom 10L, thereby being capable of freely swinging centering around the horizontal axis extending along the right to left direction (or along the left to right direction). A hydraulic attachment (referred to as an auxiliary attachment) such as a hydraulic crusher, a hydraulic breaker, an angle broom, an earth auger, a pallet fork, a sweeper, a mower, and a snow blower can be attached to the attachment 23 instead of the bucket 11.

The bucket cylinders 29 are respectively arranged on the tip sides of the right boom 10R and the left boom 10L, that is, on an inward side of the tip sides in the width direction. Upper end sides of the bucket cylinders 29 are pivotally supported via first bucket cylinder pins 26 by the booms 10R and 10L, thereby being freely rotatable centering around the horizontal axis extending along the right to left direction (or along the left to right direction). Lower end sides of the bucket cylinders 29 are pivotally supported via second bucket cylinder pins 27 by the attachment 23, thereby being freely rotatable centering around the horizontal axis extending along the right to left direction (or along the left to right direction). When the bucket cylinders 29 are stretched and shortened, the bucket 11 is swung by the stretching and shortening.

In the embodiment, each of the travel devices 5 provided to the right side and the left side employs a wheel type travel device having a front wheel 5F and a rear wheel 5R. Meanwhile, the travel devices 5 may employ a travel device of a crawler type (including a semi-crawler type).

FIG. 1 to FIG. 12 show the operation device 25 for the right hand.

The operation device 25 is used for operation (manipulation) of the skid steer loader 1, and has a plurality of operation tools 40. Operations of the operation tools 40 allows operations to various attachments attached, for example, to the skid steer loader 1. Meanwhile, various ways are known as a method for the operation to the attachment, and any method may be employed as a method for operation to the operation device 25.

The operation device 25 includes a grip portion (a grip) 30 and a head portion (a head) 31, the grip portion 30 being configured to be grasped (gripped) by an operator, the head portion 31 being disposed on a side of a top portion of the grip portion. The grip portion 30 and the head portion 31 are integrally formed of resin and the like in one body. In the following description, the operation device 25 will be explained under a condition where a lower surface of a flange portion 32 of the operation device 25 is horizontal and is located on a horizontal plane surface. For the convenience of the description, an upper side of the operation device 25 standing upward is referred to as a top portion side, and a lower side opposite to the top portion side is referred to as a grip portion side. Even when the operation device 25 is attached to a shaft 33, a positional relation, an inclination and the like of members constituting the operation device 25 is the same as those of the operation device 25 located on the horizontal plane surface. In other words, based on an arbitrary position of an outer surface constituting the flange portion 32 capable of contacting a hand when the operation device 2 is grasped, a relation between the arbitrary position and the position and inclination of the members constituting the operation device 25 is constant independently from a state of the attachment. The following description will be made on the basis of that condition.

The grip portion 30 is formed to have a cylindrical shape. A flange (the flange portion 32) is formed on a base end portion (one end) of the grip portion 30, the flange portion 32 protruding outward. In addition, the grip portion 30 is attached to the shaft 33 supported being capable of freely swinging in the front to rear direction (the rear to front direction) or in the width direction.

Firstly, an explanation will be made about an upper portion of the grip portion 30 above the flange 32 (an upper portion above a bent portion 36), that is, a shape of a torso portion of the grip portion 30.

Figure 2:
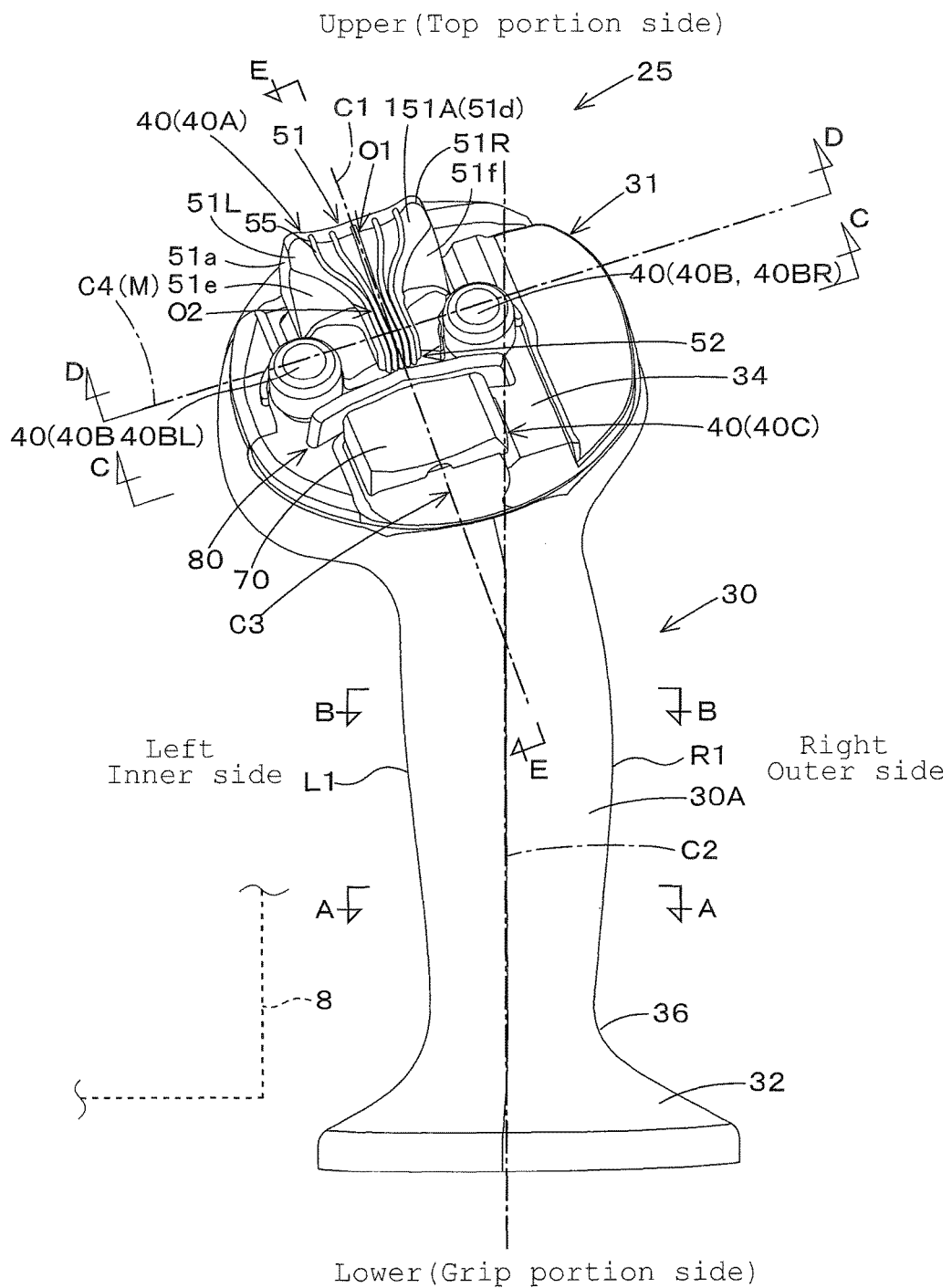
FIG. 2 is a front view (a view seen from a near side) of the operation device according to the embodiment.
Figure 4:
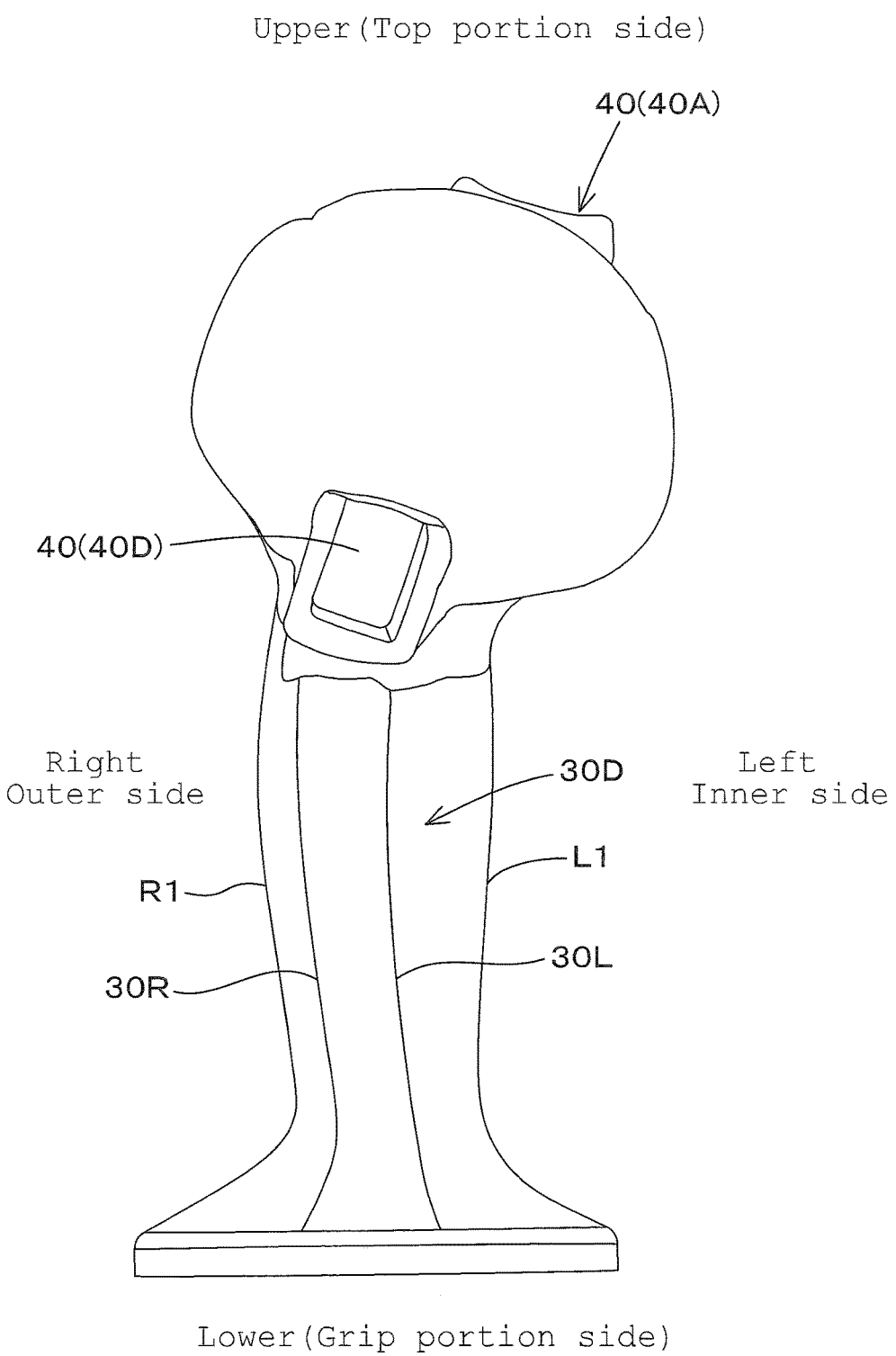
FIG. 4 is a back view (a view seen from a far side) of the operation device according to the embodiment.

As shown in FIG. 2 and FIG. 4, an outline of a left side of the grip portion 30 (referred to as a left front outline L1) gradually shifting inward along a direction from the bent portion 36, a lower end portion, to an upper side of the grip portion in a width direction in a front view and in a back view. In addition, an outline of a right side of the grip portion 30 (referred to as a right front outline R1) gradually shifting outward along a direction from the lower end portion (the bent portion 36) to the upper side of the grip portion in a width direction and gradually shifting inward in the width direction in a front view and in a back view. Comparing a curve of the left front outline L1 to a curve of the right front outline R1 (the curves corresponding to an extent of shifting inward or outward from an axial line C2 of the grip portion 30 in the width direction), the curve of the right front outline R1 is larger (more broad) than the curve of the left front outline L1.

Figure 3:
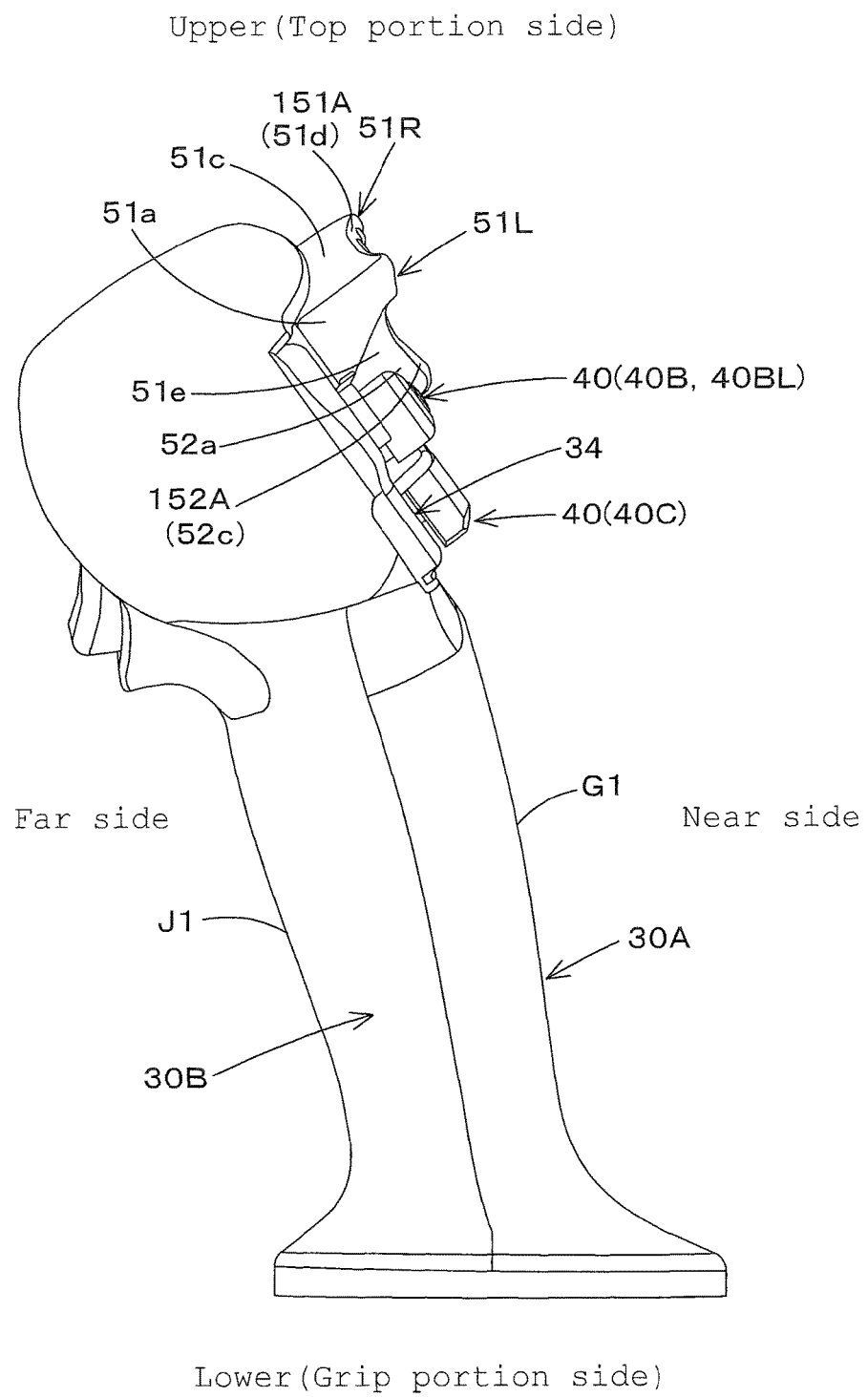
FIG. 3 is a left side view of the operation device according to the embodiment.
Figure 5:
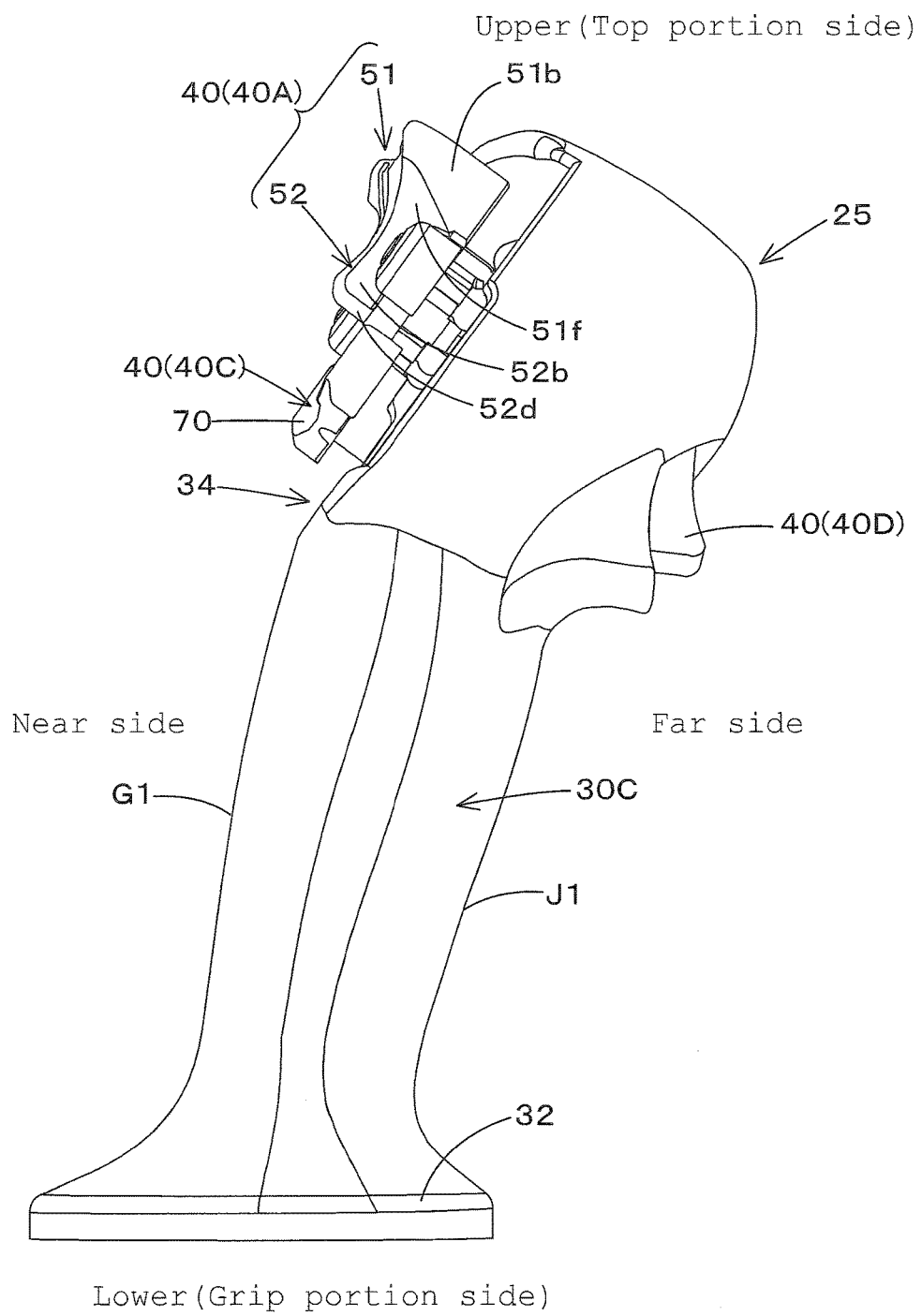
FIG. 5 is a right side view of the operation device according to the embodiment.

As shown in FIG. 3 and FIG. 5, an outline of a near side of the grip portion 30 (referred to as a near side outline G1) is inclined gradually shifting toward the far side along the direction from the lower end portion of the grip portion 30 to the upper side in a right side view and in a left side view. In addition, an outline of a far side of the grip portion 30 (referred to as a far side outline J1) is inclined gradually shifting toward the far side along the direction from the lower end portion of the grip portion 30 to the upper side in a right side view and in a left side view. That is, the grip portion 30 is inclined from the near side toward the far side in a side view.

As shown in FIG. 4, guide portions 30R and 30L is formed on a back surface side of the grip portion 30, the guide portions 30R and 30L being configured to guide gripping of the grip portion. The guide portions 30R and 30L are formed by raising the back surface side of the grip portion 30, and thus fingers of a hand can fit to second joints of the fingers under a state where the operator grasps the grip portion. In particular, a back line is formed on the back surface side of the grip portion 30, the back line being formed by continuously raising the back surface side along a longitudinal direction of the grip portion 30. The back line serves as the guide portion 30R, and another back line serves as the guide portion 30L.

The back lines (guide portions) 30R and 30L are curved lines gradually shifting outward along a direction from the lower side of the grip portion 30 to the upper side of the grip portion 30 in a width direction and gradually shifting inward along a direction from an intermediate portion of the grip portion 30 to the upper side of the grip portion 30 in the width direction. The backlines 30R and 30L appear as the far side outline J1.

Figure 6A:
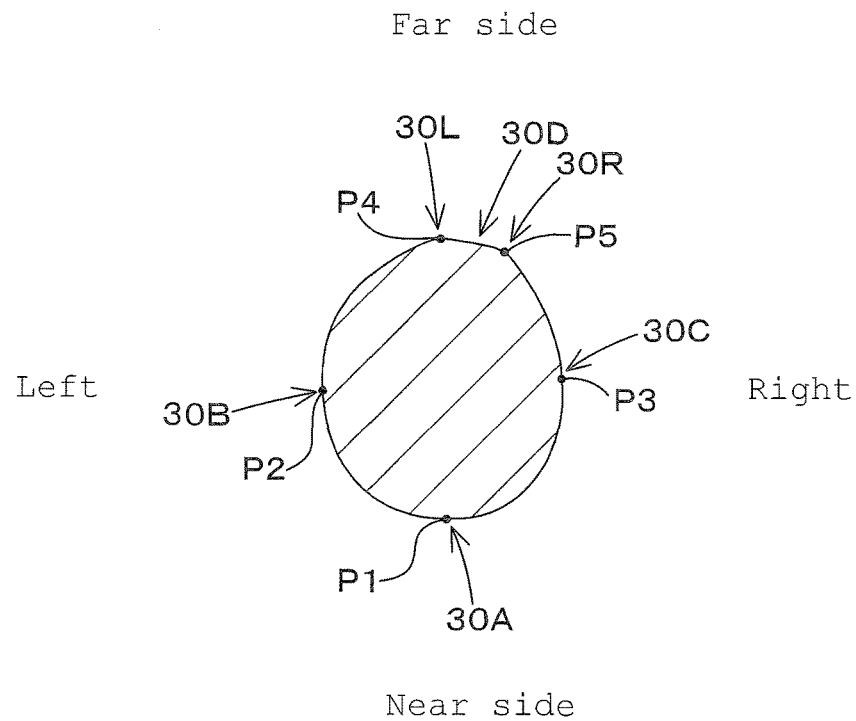
FIG. 6A is a cross-sectional view along an A-A arrowed lines in FIG. 2.
Figure 6B:
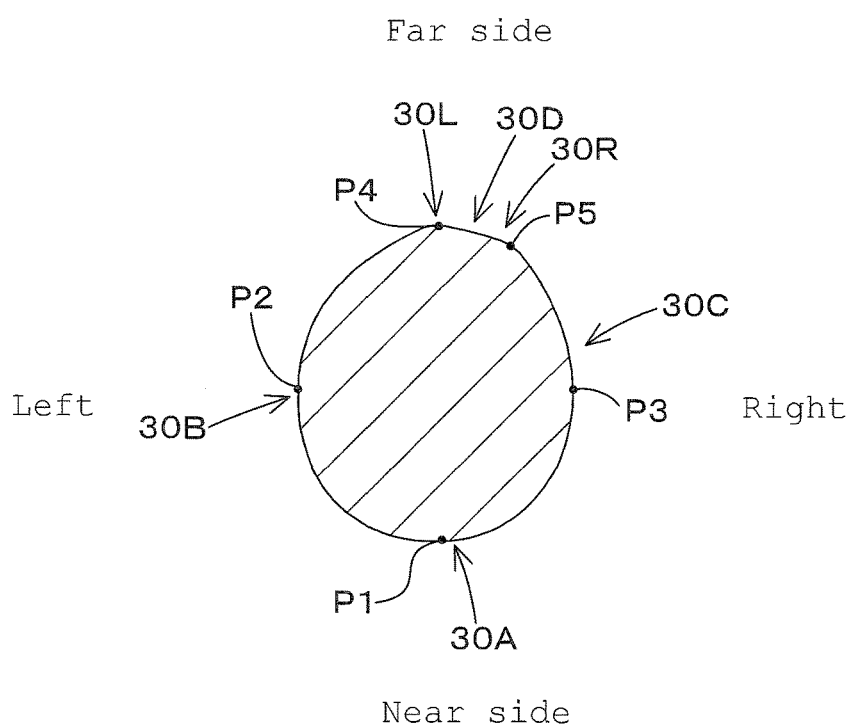
FIG. 6B is a cross-sectional view along a B-B arrowed lines in FIG. 2.

As shown in FIG. 6A and FIG. 6B, the grip portion 30 is formed to have, in a horizontal cross-sectional view, an elliptic shape (an oval shape, an ovoid shape). A near side surface 30A of the grip portion 30, a left side surface 30B of the grip portion 30, a right side surface 30C of the grip portion 30, and a back surface 30D of the grip portion 30 are each formed of a circular arc surface, the surfaces being continuously formed.

To be detailed, regarding the outer surface of the grip portion 30, the outer surface has a circular arc shape gradually shifting inward along a direction from the near side toward the far side in the width direction between a center position P1 of the near side surface 30A in the width direction and a position P2 forming the left front outline (a first outline) L1 of the left side surface 30B. In addition, the outer surface has a circular arc shape gradually shifting outward along a direction from the near side toward the far side in the width direction between the center position P1 of the near side surface 30A in the width direction and a position P3 forming the right front outline (a second outline) R1 of the right side surface 30C.

Moreover, the outer surface has a circular arc shape gradually shifting outward along a direction from the near side toward the far side between a position P2 forming the left front outline L1 of the left side surface 30B and a position P4 forming the back line 30L. Furthermore, the outer surface has a circular arc shape gradually shifting inward along a direction from the near side toward the far side between a position P3 forming the right front outline R1 of the right side surface 30C and a position P5 forming the back line 30R. In other words, the grip portion 30 has an elliptic shape formed gradually enlarging a width along a direction from the near side to the far side and gradually reducing the width along a direction from the intermediate portion to the far side.

The back surface 30D is substantially flat between the back line 30R and the back line 30L. To be detailed, a surface (a back surface) between the back line 30R and the back line 30L is inclined gradually shifting toward the near side along a direction from the point P4 forming the back line 30L to the outside in the width direction, and the inclined surface is substantially flat.

According to the grip portion 30 described above, the grip portion 30 is formed to have an elliptic shape in a cross-sectional view, and thus a position of a hand can be fixed on the grip portion 30 when the grip portion 30 is grasped. In addition, the back lines 30R and 30L are curved lines gradually shifting outward along a direction from the lower side of the grip portion 30 to the upper side of the grip portion 30 in the width direction and gradually shifting inward along a direction from the intermediate portion of the grip portion 30 to the upper side of the grip portion 30 in the width direction, and thus the fingers of the hand can be easily arranged on and along the back lines 30R and 30L in the vicinity of the second joints under a state where a pad of a thumb faces an installation portion 34 described below and then the grip portion 30 is grasped by rounding a palm of the hand to cover the grip portion 30, and thus the position of the hand can be easily fixed to the grip portion 30. That is, the positions of the fingers are easily fixed by the back lines 30R and 30L when the grip portion 30 is grasped, and thus the operation tools 40 can be easily operated.

As shown in FIG. 1 to FIG. 12, the head portion 31 has a width larger than the grip portion 30 in a front view and has a depth longer than the grip portion 30 in a side view. The head portion 31 is formed to have a globe shape (a ball shape), for example.

An installation portion 34 for installation of the plurality of the operation tools 40 is formed on the head portion 31, that is, on an outer surface of the near side (a front side). The installation portion 34 is formed of a surface facing a side of the operator seat (facing the near side), the surface being an outer surface of the head portion 31.

As shown in FIG. 3 and FIG. 5, the installation portion 34 is inclined lowering on the near side of the installation portion 34 than on the far side of the installation portion 34 from the far side toward the near side. That is, the installation portion 34 is inclined gradually shifting toward the far side along the direction from the near side to the upper side. In other words, based on an end portion on the near side (a near end portion) of the installation portion 34, the installation portion 34 is an inclined surface inclining from the near end portion toward the far side centering around an X axis (an axis extending along the width direction as shown in FIG. 1) at a predetermined angle.

Figure 10:
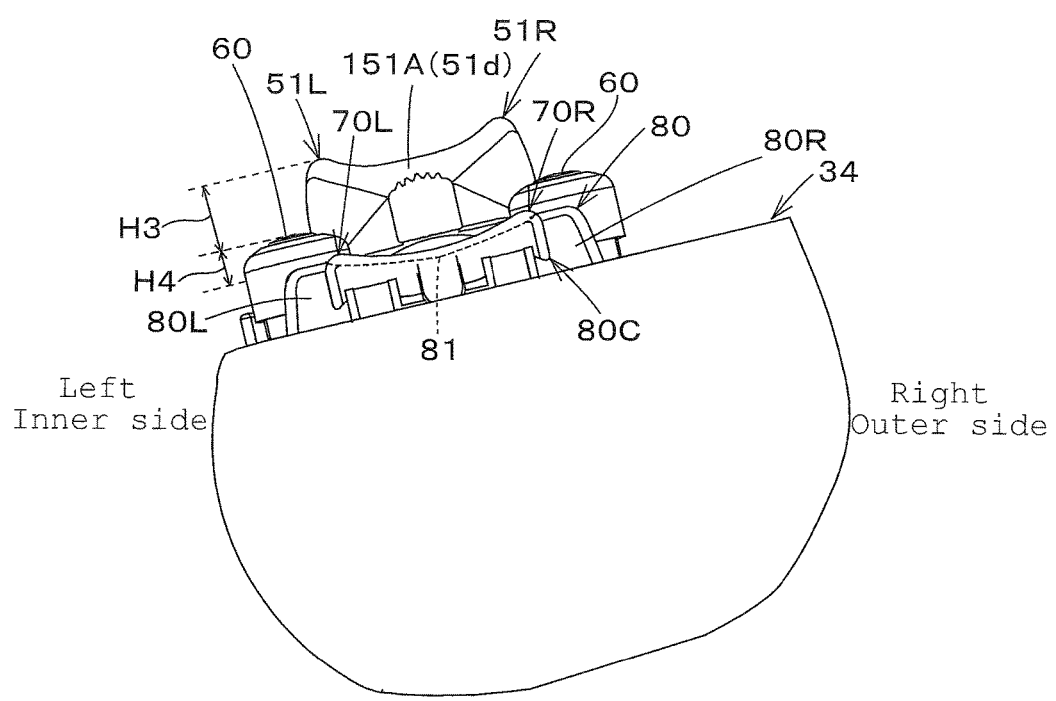
FIG. 10 is a cross-sectional view along a C-C arrowed lines in FIG. 2.
Figure 11:
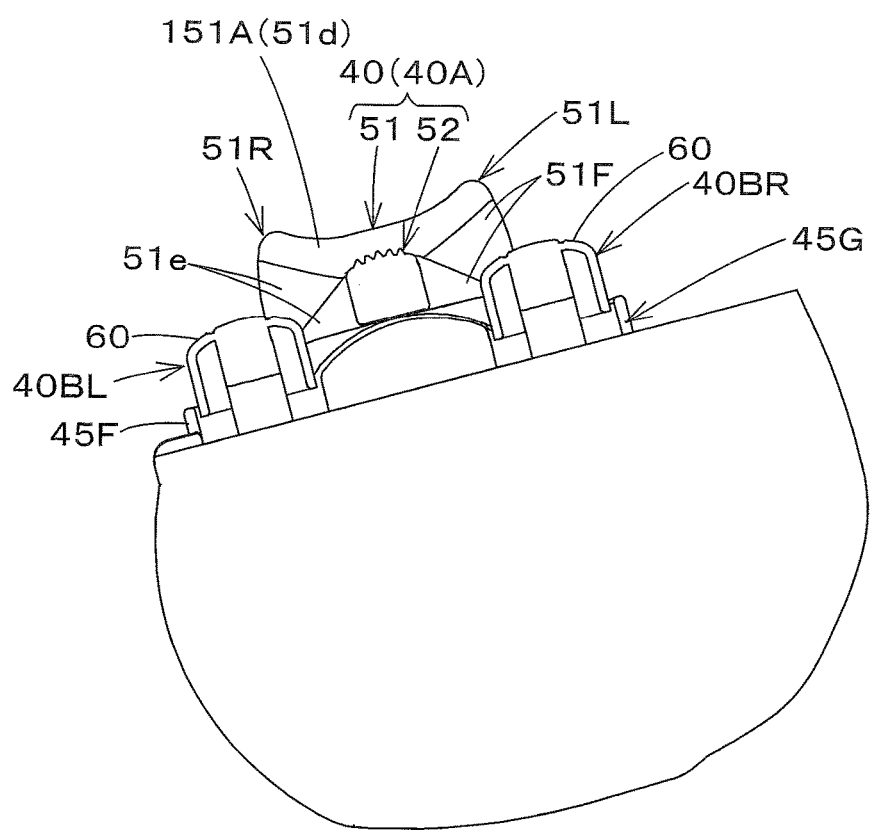
FIG. 11 is a cross-sectional view along a D-D arrowed lines in FIG. 2.

As shown in FIG. 2, FIG. 10 and FIG. 11, the installation portion 34 is inclined from the near side toward the far side, and thus the installation portion 34 is inclined to be closer to the far side on an inner side than on an outer side in the width direction from the near side toward the far side. That is, the installation portion 34 is inclined gradually shifting toward the far side along the direction from the outer side to the inner side in the width direction. In other words, based on an outer end portion of the installation portion 34 in the width direction, the installation portion 34 is an inclined surface inclining from the outer end portion toward the far side centering around a Z axis (an axis extending along a vertical direction as shown in FIG. 1) at a predetermined angle.

As shown in FIG. 2, a center portion of the near side of the installation portion 34 in the width direction is positioned outward than a center portion of the far side of the installation portion 34 in the width direction. That is, an end portion of the far side of the installation portion 34 is positioned slightly inward than an end portion of the near side in the width direction. In other words, the installation portion 34 is configured by turning about an axis perpendicular to a surface forming the installation portion 34 at a predetermined angle.

Figure 17:
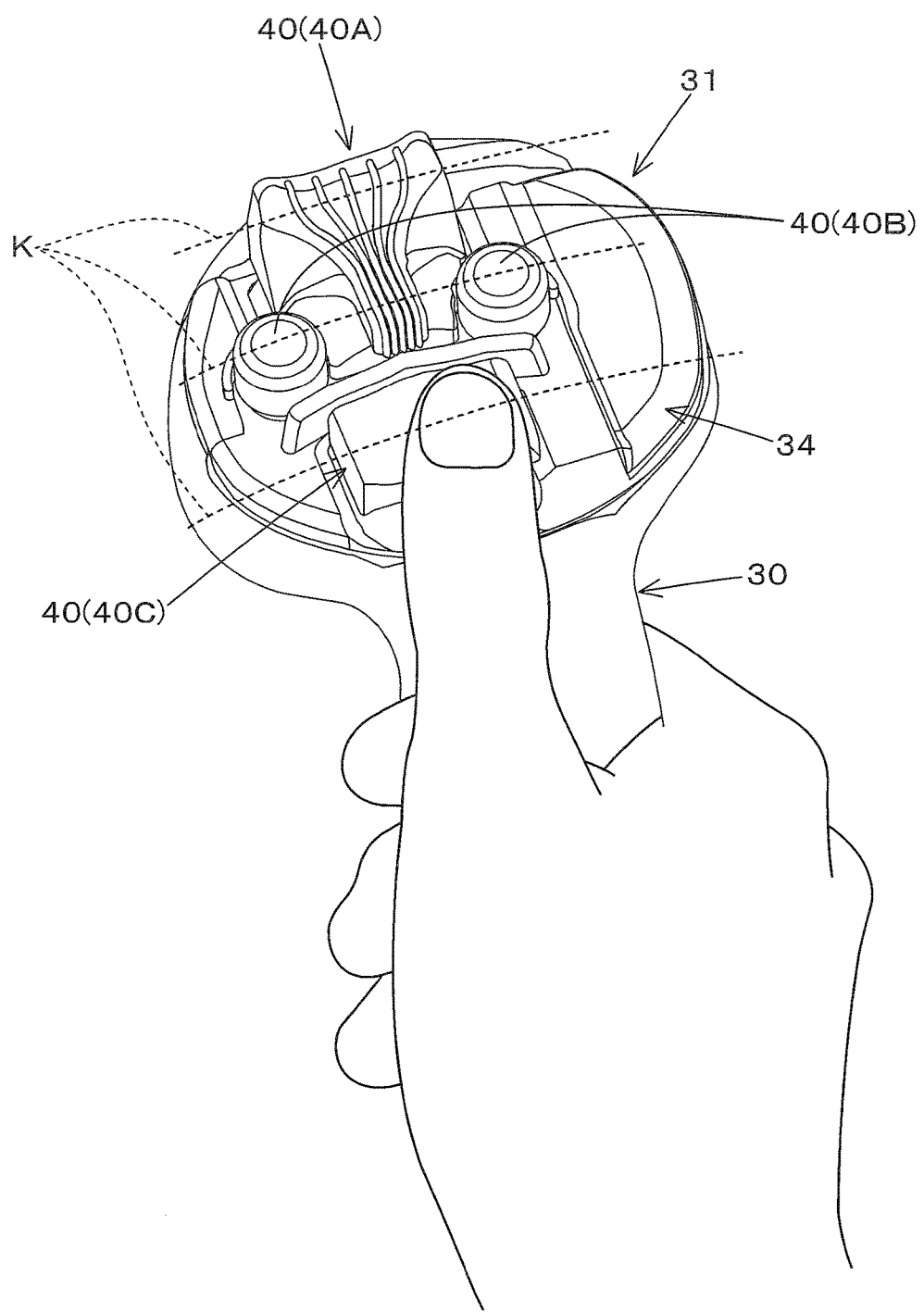
FIG. 17 is a view showing a state where the operation device is grasped.

As shown in FIG. 17, an operator grasps the grip portion 30 with a hand and stretches a thumb toward the installation portion 34 in the operation of the operation tools 40. Then, the operator puts the thumb on the operation tools 40 and moves the thumb rightward and leftward, and thus the operation tools is operated. In addition, the thumb can easily move along a track K under a state where the operator grasps the grip portion 30 and stretches the thumb, the track K having a circular arc shape in a front view. In a case where the thumb is moved on the track K from the outer side to the inner side in the width direction, it is most preferable that the thumb is moved on the track K gradually shifting from the near side toward the far side along a direction from the outer side to the inner side in the width direction. That is, it is preferred than the thumb is moved along a circular arc shape in the width direction from the near side toward the far side.

According to the configuration described above, the installation portion 34 is set along a direction similar to the track K of the thumb, that is, the installation portion 34 is set facing outward and slightly obliquely upward in the width direction, and thus the operation tools 40 disposed on the head portion 31 can be operated very easily.

Next, the plurality of operation tools 40 disposed on the installation portion 34 will be explained in detail.

As shown in FIG. 1 to FIG. 8, the plurality of operation tools 40 are attached along the inclination of the installation portion 34, and incline portions for operation in accordance with the inclination of the installation portion 34.

Of the plurality of operation tools 40 disposed on the installation portion 34 of the head portion 31, the displacement switch 40A is arranged on a top portion (an upper side) of the installation portion 34 is constituted of a displacement switch capable of being freely swung in the width direction or being freely slid in the width direction. In particular, the displacement switch 40A is constituted of a seesaw switch capable of being freely swung in the width direction. An operation amount of operation to the seesaw switch is inputted to a controller (not shown in the drawings) disposed on the skid steer loader 1.

As shown in FIG. 1 to FIG. 3, FIG. 5, FIG. 7A and FIG. 12, the displacement switch 40A includes a main operation portion 51 and a subordinate operation portion 52. The main operation portion 51 is supported being capable of being freely swung about a swing axis on an axial shaft 50 in the width direction, the axial shaft 50 being disposed inside the head portion 31. In addition, the main operation portion 51 extends in the width direction. The subordinate operation portion 52 is coupled to the main operation portion 51, and extends downward toward the grip portion 30.

Figure 9A:
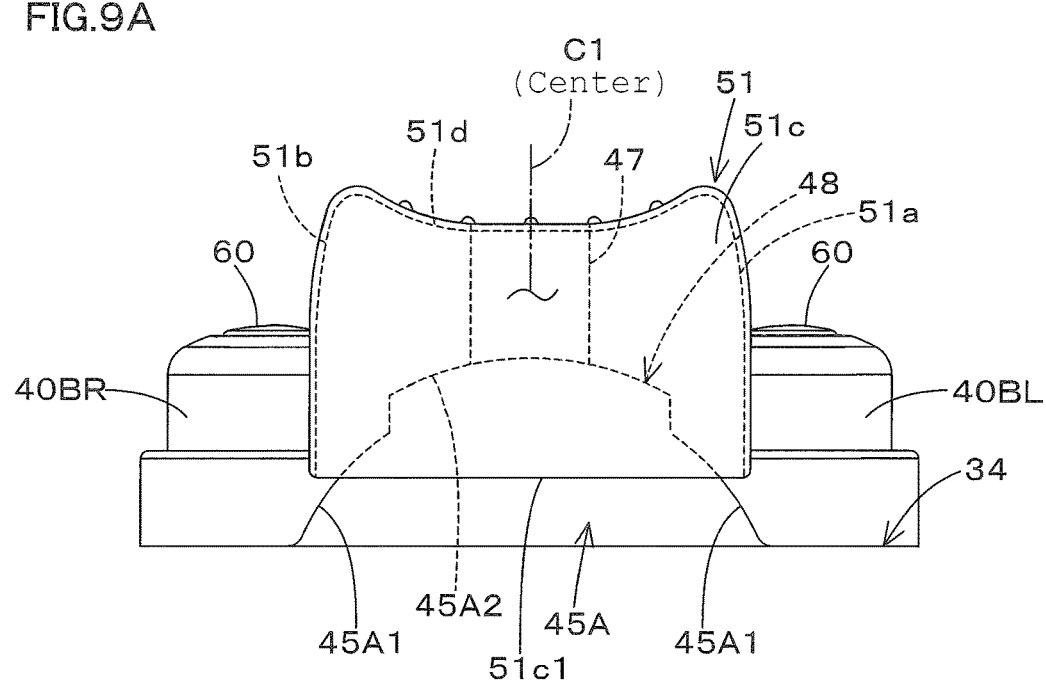
FIG. 9A is a first explanation view showing a relation between the operation tools and the base according to the embodiment.

The main operation portion 51 and the subordinate operation portion 52 are each formed to have a rectangular shape in a front view. As shown in FIG. 2, FIG. 3 and FIG. 5, the main operation portion 51 includes an inner wall (or first wall) 51a, an outer wall (or second wall) 51b, a top wall (or third wall) 51c, and an upper wall (or fourth wall) 51d. The main operation portion 51 includes a first connection wall (or fifth wall) 51e and a second connection wall (or sixth wall) 51f. As can be seen in FIGS. 9A and 18B, an interior of the main operation portion has a hollow shape.

The inner wall 51a is disposed on one side of the width direction, that is, on a left (inward) side. The outer wall 51b is disposed on the other side of the width direction, that is, on a right (outward) side. The top wall 51c connects a standing portion disposed on an apex portion side of the inner wall 51a and a standing portion disposed on an apex portion side of the outer wall 51b to each other. One of the standing portions is a rim portion extending in a height direction in the inner wall 51a, and the other one of the standing portions also is a rim portion extending in a height direction in the outer wall 51b. In other words, the top wall 51c connects the rim portion disposed on the apex portion side of the inner wall 51a and the rim portion disposed on the apex portion side of the outer wall 51b to each other. In this manner, the top wall 51c is disposed on one side (an apex side) in a direction perpendicular to the width direction. The upper wall 51d connects the inner wall 51a, the outer wall 51b and the top wall 51c to each other. The first connection wall 51e connects the inner wall 51a and the upper wall 51d to each other, and includes an inclined surface. The second connection wall 51f connects the outer wall 51b and the upper wall 51d to each other, and includes an inclined surface.

The inner wall 51a, the outer wall 51b, the top wall 51c, the upper wall 51d, the first connection wall 51i e and the second connection wall 51f are each formed of resin and the like to have a plate shape.

In an outer surface of the main operation portion 51, a surface on the near side serves as an operation surface 151A. That is, an outer surface of the upper wall 51d serves as the operation surface 151A. In other words, the operation surface 151A is formed on an outer surface of the upper wall 51d (or upper plate) connecting the inner wall 51a, the outer wall 51b and the top wall 51c to each other.

A center portion O1 of the operation surface 151A in the width direction (the outer surface of the upper wall 51d) is dented more deeply than an inner side portion (a left operation portion) 51L in the width direction and an outer side portion (a right operation portion) 51R in the width direction. That is, the main operation portion 51 includes an concave portion denting on a side of the center portion O1 in the width direction.

According to the displacement switch 40A, the left operation portion 51L and the right operation portion 51R can be moved when a thumb is put on the concave portion of the center portion O1 in the width direction (the outer surface of the upper wall 51d) and is moved in the width direction. In this manner, the displacement switch 40A is operated. The displacement switch 40A may be operated by directly putting the thumb on the left operation portion 51L and the right operation portion 51R and pressing the left operation portion 51L and the right operation portion 51R toward the installation portion 34.

An upper end of the subordinate operation portion 52 is coupled to the center portion O1 of the main operation portion 51 in the width direction. A lower end portion of the subordinate operation portion 52 is a free end. To be detailed, the subordinate operation portion 52 includes an inner wall (a seventh wall) 52a, an outer wall (an eighth wall) 52b, an upper wall (a ninth wall) 52c, and a front wall (a tenth wall) 52d. The seventh wall 52a is disposed on the left (inward) side and is coupled to the first connection wall 51e. The eighth wall 52b is disposed on the right (outward) side and is coupled to the second connection wall 51f. The ninth wall 52c connects the inner wall 52a, the outer wall 52b and the upper wall 52c to each other. The tenth wall 52d connects the inner wall 52a, the outer wall 52b and the upper wall 52c to each other. For example, the seventh wall 52a, the eighth wall 52b, the ninth wall 52c and the tenth wall 52d are each formed of resin and the like to have a plate shape.

Figure 12:
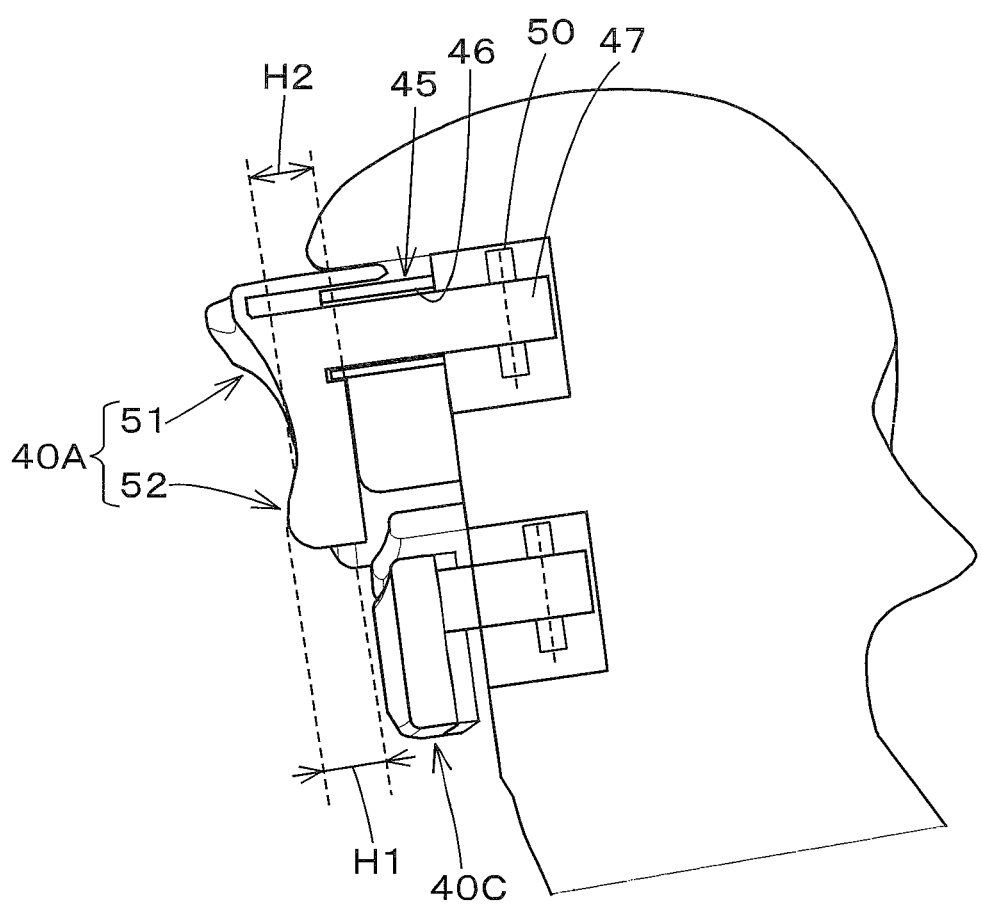
FIG. 12 is a cross-sectional view along an E-E arrowed lines in FIG. 2.

In an outer surface of the subordinate operation portion 52, a surface on the near side serves as an operation surface 152A. That is, an outer surface of the upper wall 52c serves as the operation surface 152A. The operation surface 152A (the outer surface of the upper wall 52c) is an inclined surface gradually bulging toward the near side along a direction from the top portion side to the grip portion 30. In other words, as shown in FIG. 12, a height H1 of a lower end (the free end side) of the subordinate operation portion 52 is higher than a height H2 of an upper end (the base end portion).

Then, as shown in FIG. 1 and FIG. 2, a plurality of projecting portions 55 are disposed on the operation surface 151A of the main operation portion 51 and on the operation surface 152A of the subordinate operation portion 52. The plurality of projections portions 55 disposed on the operation surface 151A and the operation surface 152A prevents fingers from slipping in the operation. In the embodiment, the projecting portions (anti-slipping portions) 55 are disposed on both of the operation surface 151A and the operation surface 152A. However, the projecting portions 55 may be disposed on either one of the operation surface 151A and the operation surface 152A.

In addition, when a center line C1 (a center line C1 of the displacement switch 40A in the width direction) is extended toward a side of the grip portion 30, the center line C1 connecting the center portion O1 of the main operation portion 51 in the width direction and the center portion O2 of the subordinate operation portion 52 in the width direction to each other, the center line C1 inclines, in a front view or in a plan view, inward (toward the operator seat 8) with respect to an extension line C2 extending an axial line (an axis) of the grip portion 30 toward the head portion 31. That is, the displacement switch 40A has a T-shape in a front view, the T-shape being constituted of the main operation portion 51 and the subordinate operation portion 52, and the displacement switch 40A of T-shape is obliquely inclined slightly inward (toward the operator seat 8) in the width direction. The left operation portion 51L of the main operation portion 51 is positioned on a side lower than the right operation portion 51R (on a side of the grip portion 30).

According to the displacement switch 40A described above, the subordinate operation portion 52 extending toward the grip portion 30 is disposed, and thus even an operator having a relatively small hand can operate the displacement switch 40A by putting a thumb on the subordinate operation portion 52 and moving the thumb in the width direction. For example, the operator grasps the grip portion 30 and stretches the thumb toward the displacement switch 40A under a state where all of or a part of an outline of a palm (between a wrist and a side surface of a little finger) is attached to the flange portion 32, and thus the operator can operate the displacement switch 40A. Here, the thumb of the small hand is sometimes hard to access the displacement switch 40A. According to an embodiment of the present invention, the subordinate operation portion 52 is provided, and thus the thumb of the operator can be put on the subordinate operation portion 52 and moved. In this manner, the operator can operate the displacement switch 40A with the grip portion 30 grasped by the operator.

In addition, the center line C1 of the displacement switch 40A is inclined inward with respect to the extension line C2 in the width direction, and thus the displacement switch 40A can be easily operated by the thumb. To be detailed, the track K of the thumb moves tracing slightly an circular arc as shown in FIG. 17 when the grip portion 30 is grasped and the thumb is vertically stretched toward the displacement switch 40A and then moved. As described above, the displacement switch 40A is inclined toward the operator seat 8 with respect to the extension line C2. In this manner, the thumb can be easily positioned on the track K, and thus operability of the displacement switch 40A can be improved.

A pair of push switches 40BR and 40BL are disposed on both end portions of the subordinate operation portion 52 in the width direction, that is, on a side lower than the main operation portion 51 (on a side of the grip portion 30), the push switches 40BR and 40BL being different from the displacement switch 40A. The push switches 40BR and 40BL each have a push button. ON and OFF of each of the push switches 40BR and 40BL are inputted to a controller (not shown in the drawings). For the convenience of the description, the push switches 40BR and 40BL are each referred to as a push switches 40B in a description explaining both of the push switch 40BR and the push switch 40BL.

As shown in FIG. 2, FIG. 7A, FIG. 10, and FIG. 11, the push switches 40B are formed to have a cylindrical shape, and includes an upper surface serving as a press surface 60 to push the push switches 40B. The center line C1 of the displacement switch 40A extends on a center portion of a virtual line M connecting the push switch 40BR and the push switch 40BL to each other. In other words, the virtual line M is perpendicular to the center line C1, and the center line C1 passes a center portion of the vertical line M. In this manner, the push switch 40BR and the push switch 40BL are arranged with respect to a position of the displacement switch 40A. That is, the push switch 40BL is arranged on a position apart inward by a predetermined distance from the center line C1 of the displacement switch 40A in the width direction, and the push switch 40BR is arranged on a position apart outward by a predetermined distance from the center line C1 of the displacement switch 40A in the width direction. In addition, a center line C4 passes through a center portion of the virtual line M connecting the push switch 40BL and the push switch 40BR to each other, and the center line C4 inclines inward (toward the operator seat 8) with respect to the extension line C2 in the width direction. In this manner, the push switch 40BR and the push switch 40BL are arranged.

Regarding the displacement switch 40A and the push switches 40B installed on the installation portion 34, the displacement switch 40A located upward is also herein referred to as an upper operation tool, and a pair of the push switches 40B located downward is also herein referred to as a lower operation tool. A positional relation between the upper operation tool and the lower operation tool will be explained below.

In the operation device 25, a height of an operation portion of the displacement switch 40A is different from a height of an operation portion of the push switches 40B. To be detailed, the press surface 60 serving as the operation portion of the push switches 40B is lower than the left operation portion 51L and the right operation portion 51R that are operation portions of the displacement switch 40A, and is located on a side closer to the installation portion 34.

The displacement switch 40A includes the left operation portion 51L and the right operation portion 51R. The left operation portion 51L and the right operation portion 51R moved toward the installation portion 34 to the maximum extent will be considered. It is preferable to set a height (a difference in level) between the press surface 60 of the push switches 40B and the left operation portion 51L and right operation portion 51R of the displacement switch 40A in accordance with a manner preventing the maximum lowering positions of the left operation portion 51L and the right operation portion 51R from being lower than a position of the pressed press surface 60 of the push switches 40B (an operation detecting position to detect the pressing), that is from being on a side of the installation portion 34. For example, a difference extent H3 is set to be larger than the maximum lowering extents of the left operation portion 51L and right operation portion 51R moved to the maximum extent (an extent of the lowering in the moving to the maximum extent). Even when the maximum lowering extents are larger than the difference extent H3, a value obtained by adding the difference extent H3 to a difference H4 between a non-operated position and the operation detecting position of the push switches 40B (H3+H4) is set to be larger than the maximum lowering extents.

Summarizing the above, in a case where the operation tools generating the operation extents detected by an identical operation, that is, the operation tools generating the operation extents detected by the pressing are arranged vertically adjacent to each other, the operation detecting position of the push switches 40B is located on a side closer to the installation portion 34 than the operation detecting position of the displacement switch 40A. That is, the operation surface 60 of the push switches 40B is located on a side closer to the installation portion 34 than the operation portions (the left operation portion 51L and the right operation portion 51R) of the displacement switch 40A. Thus, the push switches 40B adjacent to the displacement switch 40A under the displacement switch 40A can be prevented from an error operation to the push switches 40B adjacent to the displacement switch 40A under the displacement switch 40A when the displacement switch 40A is moved to the maximum extent.

In the embodiment, the displacement switch (the seesaw switch) is exemplified as the displacement switch 40A, and a pair of the push switches 40B is exemplified as the push switches 40B. However, the displacement switch 40A and the push switches 40B are not limited to the examples.

The left operation portion 51L and the right operation portion 51R each serving as the operation portion of the displacement switch 40A is higher than the operation surface 60 of the push switches 40B. In the embodiment, the installation portion 34 is provided with a base 45. The displacement switch 40A, that is, the main operation portion 51 is disposed on the base 45, and thereby the left operation portion 51L and the right operation portion 51R are higher than the operation surface 60. The base 45 is not necessarily required to make the left operation portion 51L and the right operation portion 51R higher than the operation surface 60. Increasing of a height of the displacement switch 40A may be employed instead of the base 45, and increasing of a length of a support member to swing or slid the displacement switch 40A may be employed instead of the base 45. In addition, the subordinate operation portion 52 may be disposed on the base 45 in order to increase the height of the subordinate operation portion 52 of the displacement switch 40A.

Figure 7A:
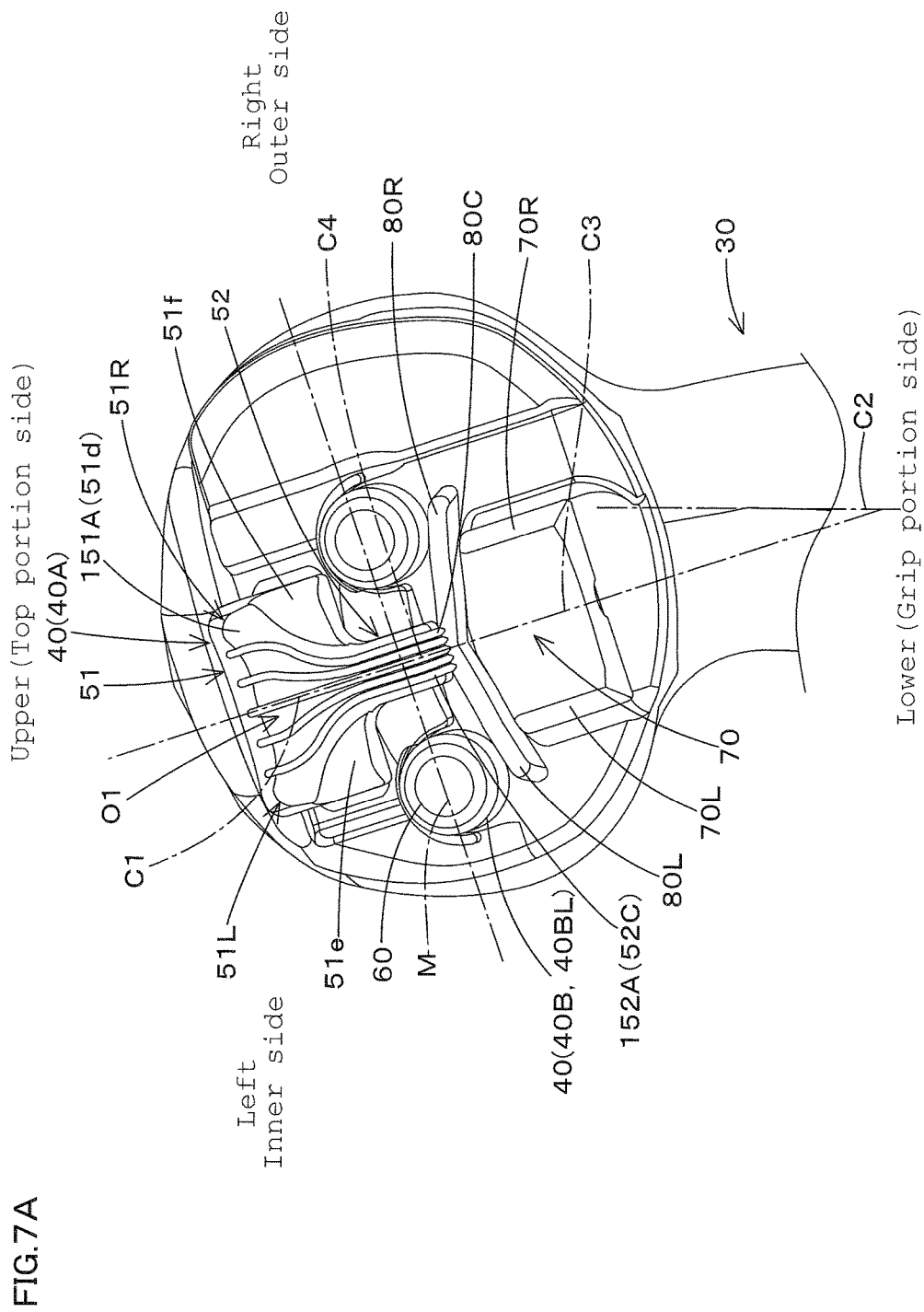
FIG. 7A is a first explanation view explaining an arrangement of operation tools according to the first embodiment.
Figure 7B:
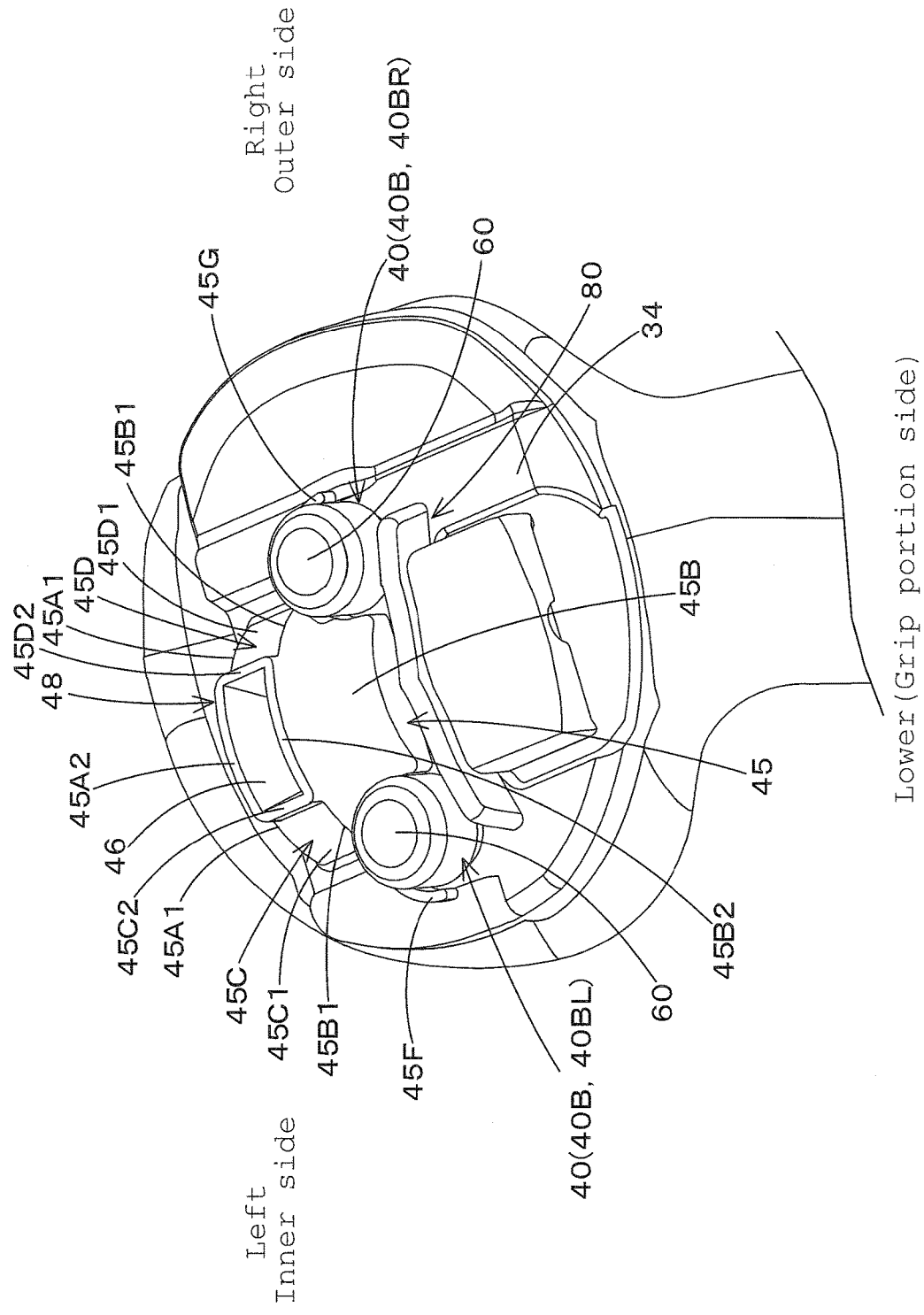
FIG. 7B is a second explanation view explaining the arrangement of the operation tools according to the first embodiment.
Figure 8A:
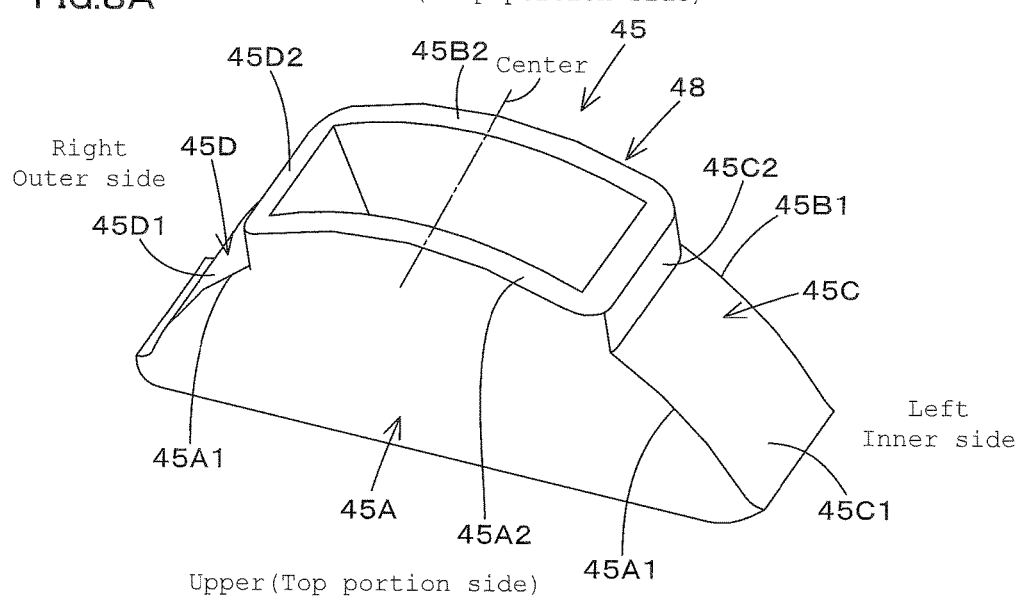
FIG. 8A is a first perspective view showing a base according to the embodiment.
Figure 8B:
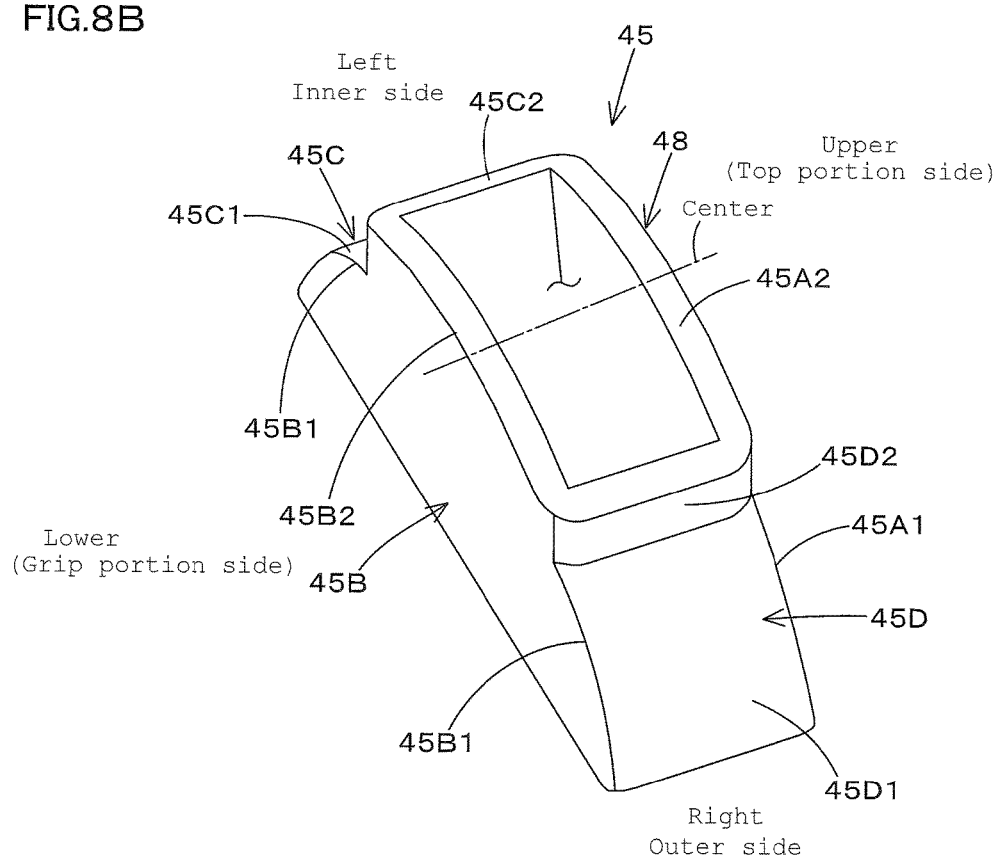
FIG. 8B is a second perspective view showing the base according to the embodiment.

As shown in FIG. 7B, FIG. 8A and FIG. 8B, the base 45 includes a top wall (an eleventh wall) 45A, a lower wall (a twelfth wall) 45B, an inner wall (a thirteenth wall) 45C, and an outer wall (a fourteenth wall) 45D. The eleventh wall 45A is disposed on a top portion side. The twelfth wall 45B is disposed on a side of the grip portion 30. The thirteenth wall 45C is disposed on an inner side. The fourteenth wall 45D is disposed on an outer side.

The eleventh wall 45A, the twelfth wall 45B, the thirteenth wall 45C, and the fourteenth wall 45D are disposed on the top portion sides of the push switch 40BL and the push switch 40BR. The eleventh wall 45A, the twelfth wall 45B, the thirteenth wall 45C, and the fourteenth wall 45D are arranged between the push switch 40BL and the push switch 40BR when seen in the width direction.

In addition, the eleventh wall 45A, the twelfth wall 45B, the thirteenth wall 45C, and the fourteenth wall 45D are each formed to have a plate shape. The eleventh wall 45A includes a rim portion 45A1 having a circular arc shape in a side view. The more the eleventh wall 45A is apart from the installation portion 34, the more the rim portion 45A1 extends toward the center line C1 (a center). The twelfth wall 45B includes a rim portion 45B 1 having a circular arc shape in the side view. The more the twelfth wall 45B is apart from the installation portion 34, the more the rim portion 45B1 extends toward the center line C1 (the center). The thirteenth wall 45C includes an outer surface 45C1 having a circular arc shape. The more the thirteenth wall 45C is apart from the installation portion 34, the more the outer surface 45C1 extends toward the center line C1 (the center). The fourteenth wall 45D includes an outer surface 45D1 having a circular arc shape. The more the fourteenth wall 45D is apart from the installation portion 34, the more the outer surface 45D1 extends toward the center line C1 (the center).

The eleventh wall 45A includes a standing portion 45A2 standing from an end portion of the rim portion 45A1 in the width direction (an end portion on a side of the center line C1). The twelfth wall 45B includes a standing portion 45B2 standing from an end portion of the rim portion 45B1 in the width direction (an end portion on a side of the center line C1). The thirteenth wall 45C includes a standing portion 45C2 standing from an end portion of the outer surface 45C1 in the width direction (an end portion on a side of the center line C1). The fourteenth wall 45D includes a standing portion 45D2 standing from an end portion of the outer surface 45D1 in the width direction (an end portion on a side of the center line C1). And, a partially-cylindrical member 48 is constituted of the standing portion 45A2, the standing portion 45B2, the standing portion 45C2, and the standing portion 45D2, and an inner surface of the partially-cylindrical member 48 serves as an insertion inlet 46. A support member 47 is inserted into the insertion inlet 46, the support member 47 being fixed to the displacement switch 40A (the upper wall 51d) at one end of the support member 47 and is supported by the axial shaft 50 at the other end in a freely swingable manner. The displacement switch 40A (the main operation portion 51 and the subordinate operation portion 52) can be swung by the support member 47.

In particular, the base 45 includes the partially-cylindrical member 48 constituted of the plurality of standing portions 45A2, 45B2, 45C2 and 45D2, and the partially-cylindrical member 48 forms the insertion inlet 46 for insertion of the support member 47. The standing portions 45A2, 45B2, 45C2 and 45D2 form a peripheral wall that surrounds the insertion inlet 46, as can be seen in FIGS. 8A and 8B.

Figure 9B:
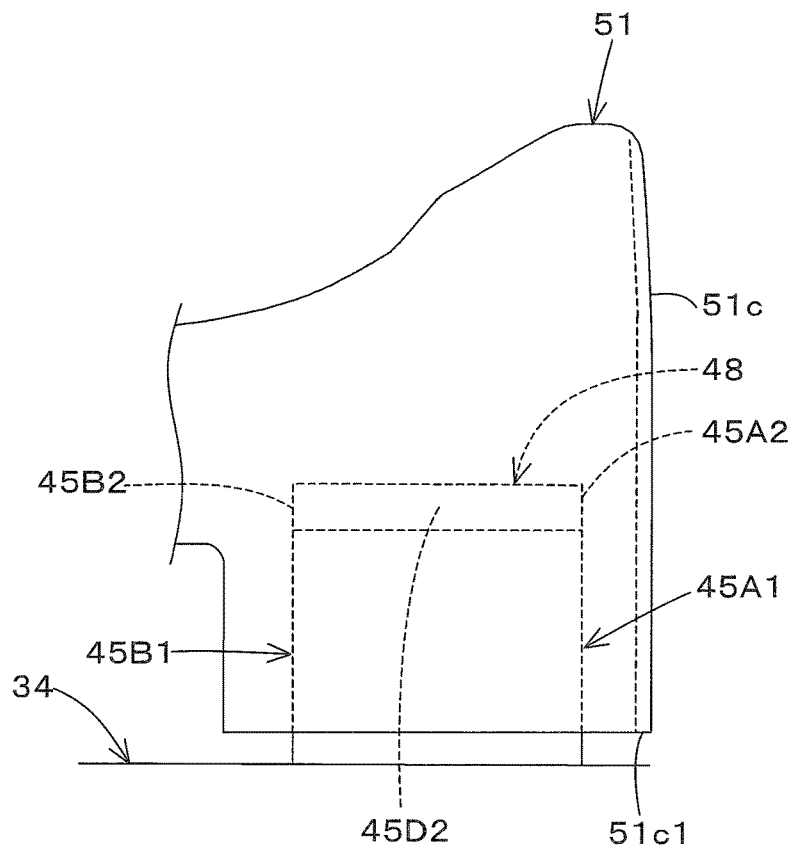
FIG. 9B is a second explanation view showing the relation between the operation tools and the base according to the embodiment.

As shown in FIG. 9A and FIG. 9B, the top wall 51c of the main operation portion 51 is located on a side closer to the top portion than the eleventh wall 45A. The top wall 51c is overlapped at least with a part of the eleventh wall 45A. To be detailed, regarding the top wall 51c, an end portion 51c1 closer to the installation portion 34 (an end portion opposed to the installation portion 34) is closer to the installation portion 34 than the partially-cylindrical member 48, and the partially-cylindrical member 48 is overlapped with the top wall 51c in a height direction. In other words, the end portion 51c1 of the top wall 51c is located to be lower than the standing portions 45A2, 45B2, 45C2 and 45D2 in a side view.

As described above, the top wall 51c is positioned on a side closer to the top portion than the base 45 (the partially-cylindrical member 48), and the end portion 51c1 of the top wall 51c is positioned being closer to the installation portion 34 than the partially-cylindrical member 48. In this manner, the top wall 51c and the partially-cylindrical member 48 blocks outside unnecessary substance (for example, soil, sand, water and mud) and can suppress intrusion of the outside unnecessary substance into the insertion inlet 46.

In the embodiment, the top wall 51c is overlapped with the partially-cylindrical member 48 even when the main operation portion 51 is swung. To be detailed, a part of the top wall 51c is overlapped with the partially-cylindrical member 48 under a state where the main operation portion 51 is fully swung to the leftmost side, and a part of the top wall 51c is overlapped with the partially-cylindrical member 48 under a state where the main operation portion 51 is fully swung to the rightmost side.

In addition, the partially-cylindrical member 48 is surrounded not only by the top wall 51c but by the inner wall 51a, the upper wall 51d, the first connection wall 51e and the second connection wall 51f. In this manner, the inner wall 51a, the upper wall 51d, the first connection wall 51e and the second connection wall 51f can suppress intrusion of the outside unnecessary substance (for example, soil, sand, water and mud) into an inside of the partially-cylindrical member 48. Thus, the main operation portion 51 covers the insertion inlet 46 such that a side surface of the main operation portion 51 surrounds an outer peripheral surface of the peripheral wall formed by the standing portions 45A2, 45B2, 45C2 and 45D2, as can be seen, for example, in FIGS. 9A, 9B, 12, and 18B.

Moreover, the base 45 includes an intermediate wall 45E, a first cover portion 45F and a second cover portion 45G, the intermediate wall 45E being disposed on a side closer to the grip portion 30 when seen from the twelfth wall 45B, the first cover portion 45F being disposed on the inside (the left side) and coupled to the intermediate wall 45E, the second cover portion 45G being disposed on the outside (the right side) and coupled to the intermediate wall 45E.

The intermediate wall 45E is arranged between the push switch 40BL and the push switch 40BR. The first cover portion 45F is formed continuously from the intermediate wall 45E and covers an outer periphery portion of the push switch 40BL. The second cover portion 45G is formed continuously from the intermediate wall 45E and covers an outer periphery portion of the push switch 40BR.

To be detailed, the first cover portion 45F is extended from an end portion of the intermediate wall 45E, the end portion being on an inside in the width direction, toward the inside in the width direction along the outer periphery portion of the push switch 40BL, and covers approximately a half of the outer periphery portion of the push switch 40BL (approximately a half of the top portion side). In addition, the second cover portion 45G is extended from an end portion of the intermediate wall 45E, the end portion being on an outside in the width direction, toward the outside in the width direction along the outer periphery portion of the push switch 40BR, and covers approximately a half of the outer periphery portion of the push switch 40BR (approximately a half of the top portion side).

As described above, the base 45 is disposed on the installation portion 34, and the displacement switch 40A is disposed on the base 45. In this manner, the operation portion of the displacement switch 40A can be easily set to be higher than the operation portion of the push switches 40B. In addition, at least an upper side (the top portion side) of the push switches 40B can be covered with a cover portion of the base 45 raising the displacement switch 40A higher, and thus the cover portion can prevent intrusion of the outside unnecessary substance (for example, soil, sand, water and mud) into an attachment portion of the push switches 40B.

In the embodiment, the displacement switch (the seesaw switch) is exemplified as the displacement switch 40A, and a pair of the push switches 40B is exemplified as the push switches 40B. The displacement switch 40A and the push switches 40B are not limited to the examples.

As shown in FIG. 1 to FIG. 10, the displacement switch 40C is disposed on a side lower than the push switches 40B. The displacement switch 40C is constituted of a seesaw switch capable of being freely swung in the width direction. An operation amount of operation to the seesaw switch is inputted to a controller (not shown in the drawings) disposed on the skid steer loader 1.

A positional relation between the displacement switch 40C and the push switches 40B will be explained.

The displacement switch 40C is formed to have a rectangular shape in a front view, and, a surface on the near side in the outer surface serves as an operation surface 70. An inside portion of the operation surface 70 in the width direction serves as a left operation surface 70L and the outside portion in the width direction serves as a right operation surface 70R. The left operation surface 70L and the push switch 40BL are arranged to be overlapped with each other in a vertical direction, and the left operation surface 70L is lower than the operation surface 60 (the press surface 60) of the push switch 40BL and is located on a side closer to the installation portion 34.

The right operation surface 70R and the push switch 40BR are arranged to be overlapped with each other in a vertical direction, and the right operation surface 70R is lower than the operation surface 60 (the press surface 60) of the push switch 40BR and is located on a side closer to the installation portion 34. In other words, the left operation surface 70L is arranged on a side lower than the push switch 40BL (a side closer to the grip portion 30), the right operation surface 70R is arranged on a side lower than the push switch 40BR (a side closer to the grip portion 30), and the operation surface 60 (the press surface 60) of the push switches 40B are located on a position higher than the left operation surface 70L and the right operation surface 70R.

A center portion O3 of the displacement switch 40C in the width direction is located on the center line C1 when the center line C1 of the displacement switch 40A is extended toward a side of the grip portion 30. That is, a center line C3 passing through the center portion O3 of the displacement switch 40C in the width direction is identically on the center line C1 of the displacement switch 40A. In this manner, the displacement switch 40C is arranged.

As described above, the displacement switch 40C according to the embodiment can be operated by pushing the left operation surface 70L and the right operation surface 70R with a thumb or the others. The displacement switch 40C may be operated by putting a thumb on a side closer to the center portion O3 of the operation surface 70 in the width direction and moving the thumb toward the left operation surface 70L or toward the right operation surface 70R. As shown in FIG. 1 to FIG. 8, a displacement switch 40D capable of being freely swung may be disposed on a right side of the installation portion 34, and a push switch 40E may be disposed on the back surface side of the installation portion 34.

As shown in FIG. 2, FIG. 7A, FIG. 7B and FIG. 10, an error operation prevention member 80 is disposed between the push switches 40B and the displacement switch 40C. The error operation prevention member 80 is a member configured to block intrusion of the finger from the displacement switch 40C into the push switches 40B and to accept intrusion of the displacement switch 40A, and is constituted of a member standing from the installation portion 34.

To be detailed, as shown in FIG. 10, the standing member (the error operation prevention member 80) is extended between the push switches 40B and the displacement switch 40C from the push switch 40BL toward the push switch 40BR. In the embodiment, the standing member 80 is extended at least from the innermost rim portion of the push switch 40BL (a rim portion on the innermost side in a cross-sectional view) to the outermost rim portion of the push switch 40BR (a rim portion on the outermost side in the cross-sectional view), the innermost rim portion being on an inside of the push switch 40BL in the width direction, the outermost rim portion being on an outside of the push switch 40BR in the width direction.

The standing member 80 includes a left wall 80L, a right wall 80R, and a center wall 80C, the left wall 80L standing between a side below the push switch 40BL (a side closer to the grip portion 30) and the left operation surface 70L of the displacement switch 40C, the right wall 80R standing between a side below the push switch 40BR (a side closer to the grip portion 30) and the right operation surface 70R of the displacement switch 40C, the center wall 80C being arranged between the left wall 80L and the right wall 80R.

The left wall 80L and the right wall 80R each stand between the left operation surface 70L and the right operation surface 70R, and thus that configuration blocks intrusion of a thumb from the displacement switch 40C into the push switches 40B.

The center wall 80C may be gradually shifted and lowered toward the installation portion 34 along a direction from an end portion being on an inside of the center wall 80C in the width direction to the outside in the width direction. For example, a low wall 81 may be formed on the center portion 80C, the low wall 81 being lower than the left operation surface 70L of the displacement switch 40C, being lower than the right operation surface 70R of the displacement switch 40C and being lower than the center portion O3 of the displacement switch 40C.

The low wall 81 accepts intrusion of the thumb from the grip portion 30 to the center portion 80C, and accepts intrusion of the thumb to the displacement switch 40A arranged on a side above the center portion 80C (a side closer to the top portion).

Thereby, the installation portion is inclined lowering on a near side than on a far side opposed to the near side from the far side toward the near side, and is inclined to be closer to the far side on an inner side than on an outer side in a width direction from the near side toward the far side. Accordingly, a pad of a thumb can be easily moved along the installation portion under a state where an operator grasps the grip portion with a hand and stretches the thumb of the hand toward a head portion, and thus the operation tools arranged on the installation portion can be easily operated by the thumb.

Second Embodiment

A second embodiment of the present invention is a modified example changing arrangement and the like of operation tools arranged on an installation portion. The second embodiment will be described below. Explanation of configurations same as those of the first embodiment will be omitted.

Figure 13:
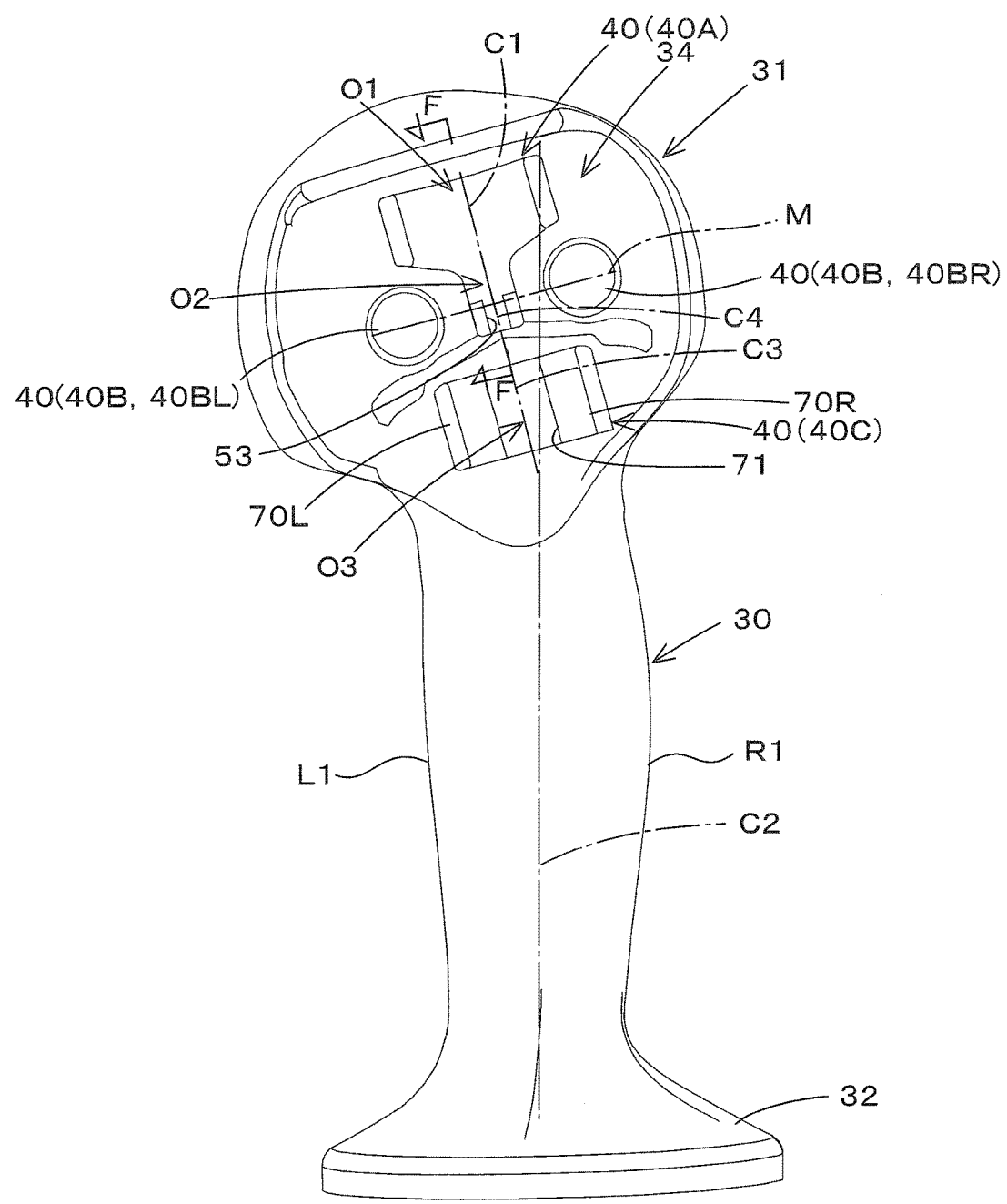
FIG. 13 is an arrangement plan of operation tools in an operation device according to a second embodiment.
Figure 14:
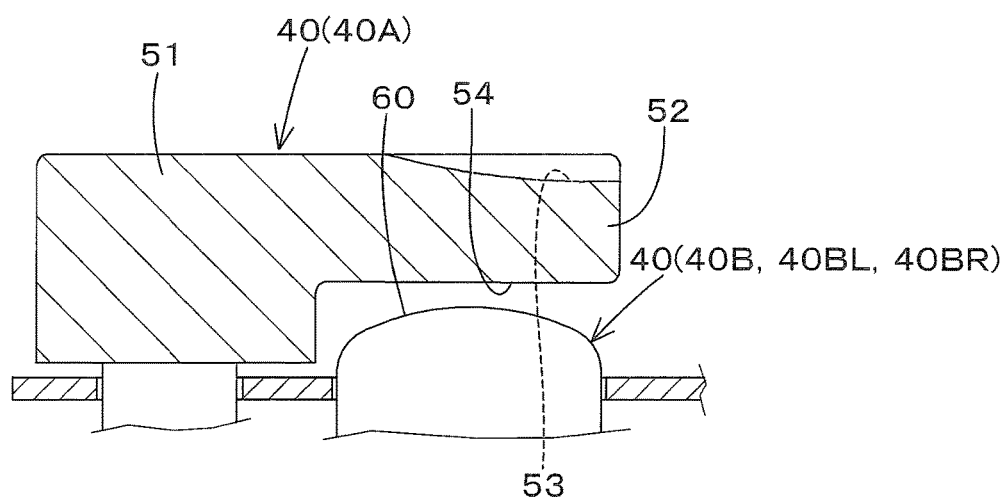
FIG. 14 is a cross-sectional view along an F-F arrowed lines in FIG. 13.

FIG. 13 is a view showing an arrangement of the operation tools. FIG. 14 is a cross-sectional view along an F-F arrowed lines in FIG. 11. The installation portion 34 has a configuration different from that described in the first embodiment, and stands approximately vertically. That is, a lower end portion (a side closer to the grip portion 30) of the installation portion 34 and an upper end portion (a side closer to the top portion) of the installation portion 34 are each located on a vertical plane surface, and thus the installation portion 34 is not inclined toward the far side.

The displacement switch 40A is constituted of a seesaw switch capable of being freely swung about a vertical axis. The displacement switch 40A is arranged as the operation tool on the installation portion 34. The displacement switch 40A includes the main operation portion 51 and the subordinate operation portion 52. A concave portion (a finger-hooking portion) 53 is formed on the tip side (the free end side) of the subordinate operation portion 52, the concave portion 53 being dented toward a side closer to the installation portion 34 to help a thumb be hooked.

To be detailed, as shown in FIG. 13 and FIG. 14, the concave portion 53 is formed to have a semicircular shape being gradually close to the installation portion 34 along a direction from an end portion of an inner side in the width direction toward an outside in the width direction and being gradually apart from the installation portion 34 along a direction from the center portion O2 in the width direction toward the outside in the width direction. A pad of thumb is putted on the concave portion 53, and thus the thumb can be hooked on the concave portion 53. In this manner, the displacement switch 40A can be easily moved in the width direction.

Then, considering a relation between the extension line C2 and the displacement switch 40A, the displacement switch 40A is arranged to pass through the extension line C2. To be detailed, the extension line C2 passes above the main operation portion 51 of the displacement switch 40A, and the center portion O1 of the main operation portion 51 in the width direction is apart from the extension line C2 toward an inside in the width direction. In addition, when the center line C1 is extended toward the grip portion 30, the center line C1 connecting the center portion O1 of the main operation portion 51 in the width direction and the center portion O2 of the subordinate operation portion 52 in the width direction, the center line C1 is inclined inward in the width direction with respect to the extension line C2 obtained by extending an axial line of the grip portion 30 toward the head portion 31. That is, the displacement switch 40A has a T-shape in a front view, the T-shape being constituted of the main operation portion 51 and the subordinate operation portion 52, and the displacement switch 40A of the T-shape is obliquely inclined slightly inward in the width direction.

A pair of the push switch 40BL and the push switch 40BR are arranged on both sides of the subordinate operation portion 52 of the displacement switch 40A. Considering a relation between the extension line C2 and the push switches 40B, the push switches 40B are arranged on both sides of the extension line C2. To be detailed, the push switch 40BR is arranged on the extension line C2 or on a side outer than the extension line C2 in the width direction, and the push switch 40BL is arranged on a side inner than the extension line C2 in the width direction. A center portion of the virtual line M is apart from the extension line C2 toward an inside in the width direction, the virtual line M connecting the push switch 40BL and the push switch 40BR to each other. In addition, the center line C4 is inclined inward in the width direction with respect to the extension line C2, the center line C4 passing through a center portion of the virtual line M connecting the push switch 40BL and the push switch 40BR to each other.

In this manner, the displacement switch 40A and the push switches 40B are located slightly inward in the width direction, and the operation portions of the operation tool 40 (the left operation portion 51L and the right operation portion 51R) and the operation surface 60 of the push switches 40B are positioned on the track K of the thumb, and thus the operability of the displacement switch 40A and the push switches 40B can be improved.

Then, the operation tool 40 passes above the push switches 40B when the displacement switch 40A is moved in the width direction. To be detailed, as shown in FIG. 14, the operation surface 60 of the push switches 40B scarcely protrudes from the installation portion 34, and is positioned on a height substantially identical to a height of a surface of the installation portion 34. The subordinate operation portion 52 of the displacement switch 40A is positioned above the operation surface 60 of the push switches 40B, and an escape portion 54 is formed in the subordinate operation portion 52, the escape portion 54 being configured to escape from interference with the push switches 40B serving as the operation tool. The escape portion 54 is formed by cutting off a bottom portion (on a side closer to the installation portion 34) of the subordinate operation portion 52, and thus the subordinate operation portion 52 can pass through the operation surface 60 in the operation.

As described above, the push switches 40B can be made close to the displacement switch 40A as much as possible, and thus a length (a width) of the head portion 31, that is, the installation 34 can be reduced.

The displacement switch 40C is disposed on a side below the push switches 40B. The displacement switch 40C is constituted of a seesaw switch capable of being freely swung in the width direction. As in the first embodiment, the center portion O3 of the displacement switch 40C in the width direction can be positioned on the center line C1 when the center line C1 of the displacement switch 40A is extended toward the grip portion 30. A concave portion (a finger-hooking portion) 71 is formed on a portion overlapped with the center line C1 extended from the subordinate operation portion 52 of the displacement switch 40A toward the grip portion 30, the portion being the center portion O3 of the displacement switch 40C in the width direction, that is, on the displacement switch 40C, the concave portion 71 allowing passage of a thumb and helping the thumb be hooked. To be detailed, the concave portion 71 is formed to have a semicircular shape being gradually close to the installation portion 34 along a direction from an end portion of an inner side in the width direction toward an outside in the width direction and being gradually apart from the installation portion 34 along a direction from the center portion O3 in the width direction toward the outside in the width direction.

According to the concave portion 71, a thumb is allowed to move toward the displacement switch 40A, and a pad of the thumb can be hooked on the concave portion 71 in the operation.

The installation portion 34 according to the second embodiment is configured to be substantially vertical, however, may be inclined as in the first embodiment. That is, the installation portion 34 may be inclined lowering on the near side than on the far side of the installation portion 34 from the far side toward the near side, and may be inclined to be closer to the far side on the inner side than on the outer side in a width direction from the near side toward the far side. In addition, a center portion on the near side of the installation portion 34 in the width direction may be positioned on a side outer than a center portion on the far side in the width direction.

Figure 15:
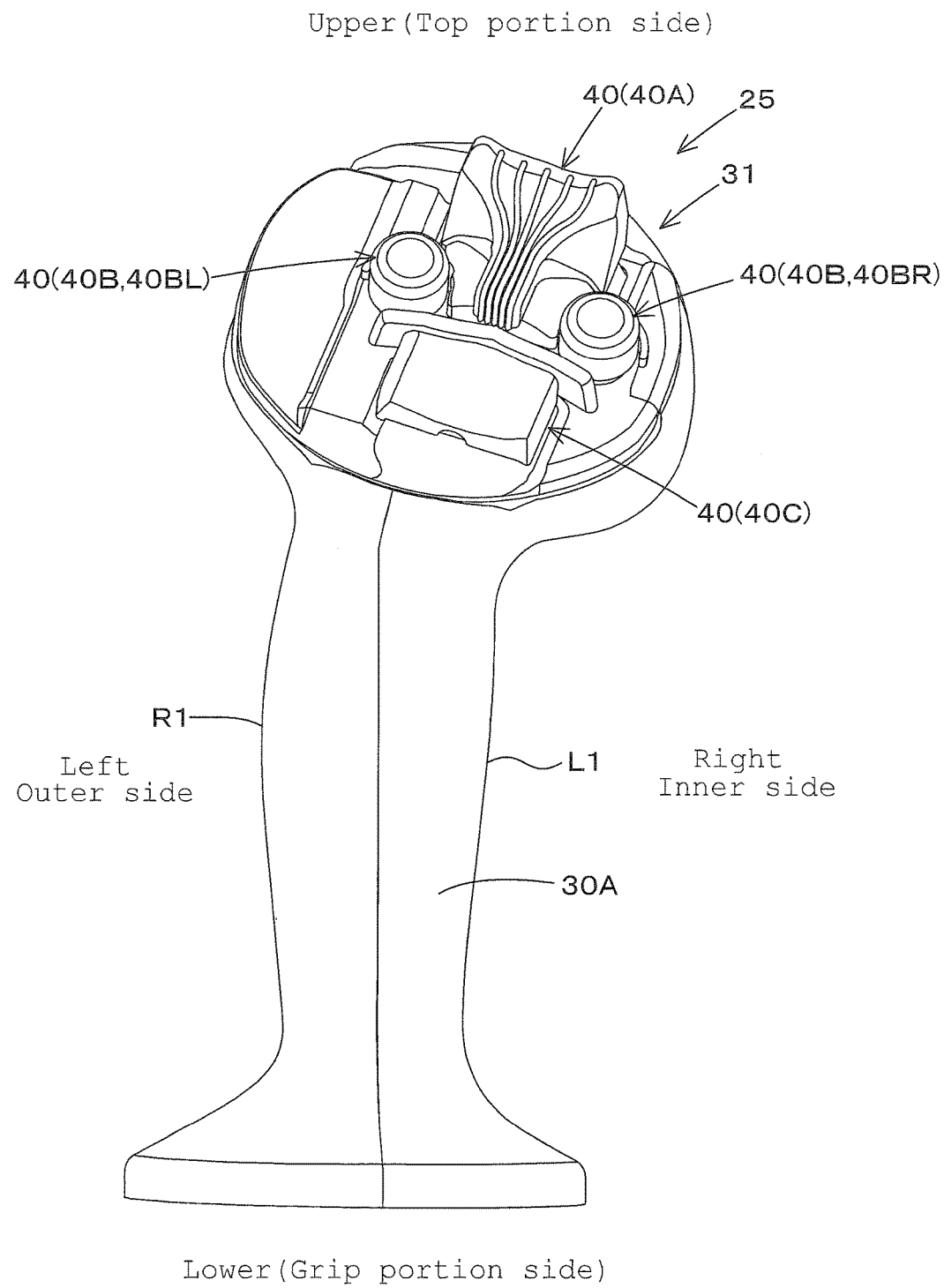
FIG. 15 is a front view of the operation device for a left hand according to the embodiment.

In the embodiment described above, the operation device 25 for the right hand is explained. However, as shown in FIG. 15, the operation device 25 for the left hand may be employed. The operation device 25 for the left hand has a bilaterally symmetric configuration with respect to the operation device 25 for the right hand, and the configurations of the installation portion 34 and the grip portion 30 are the same as those in the first embodiment.

Figure 16:
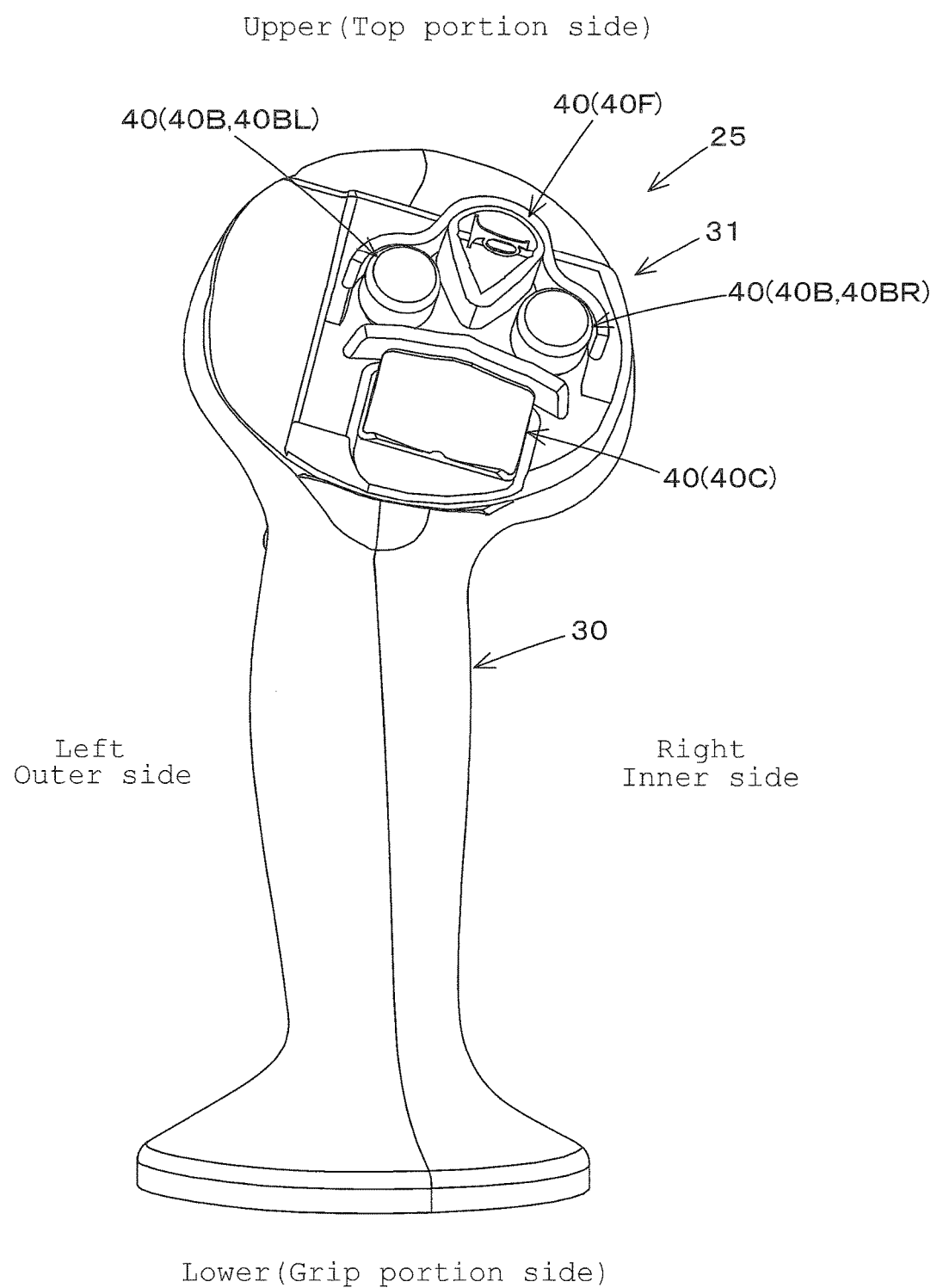
FIG. 16 is a view showing a modified example of the operation tools arranged on an installation portion according to the embodiment.

As shown in FIG. 16, the operation tool 40 arranged on the installation portion 34 may be changed in the operation device 25 for the left hand. An operation tool constituted of the push switch 40F is arranged on a top portion side of the installation portion 34, the push switch 40BL and the push switch 40BR are arranged on both sides of the push switch 40F in the width direction, and the displacement switch 40C is disposed on sides below the push switch 40BL and the push switch 40BR (on a side closer to the grip portion 30). The push switch BL, the push switch BR and the displacement switch 40C have the same configuration as those in the embodiments described above. The operation tool arranged on the top portion side of the installation portion 34, that is, the push switch 40F is a switch having a reversed-drop shape, the reversed-drop shape formed to be wider on an upper portion side and narrower on a lower portion side. The push switch 40F shown in FIG. 16 may be disposed on the operation device 25 for the right hand.

In the embodiments described above, the displacement switch 40A includes both of the main operation portion 51 and the subordinate operation portion 52. The displacement switch 40A, however, may include only the main operation portion 51 from among the main operation portion 51 and the subordinate operation portion 52 as shown in FIG. 18A.

Next, referring to FIG. 18A and FIG. 18B, a modified example of the displacement switch 40A will be explained.

Figure 18A:
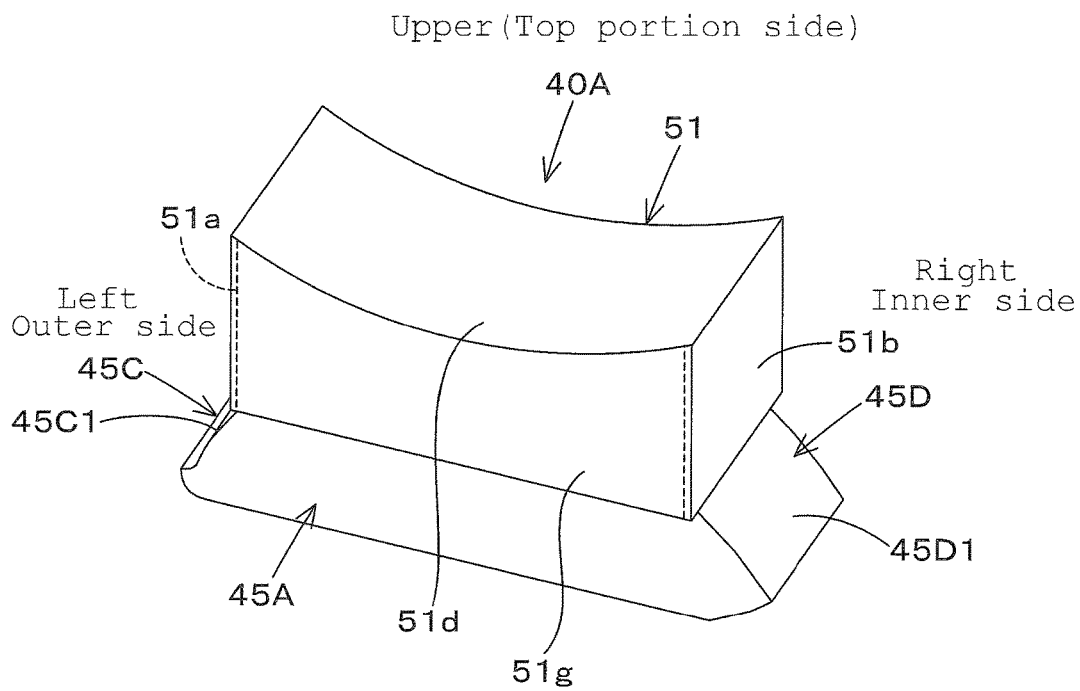
FIG. 18A is an explanation view explaining a modified example of the operation tools according to the embodiment.
Figure 18B:
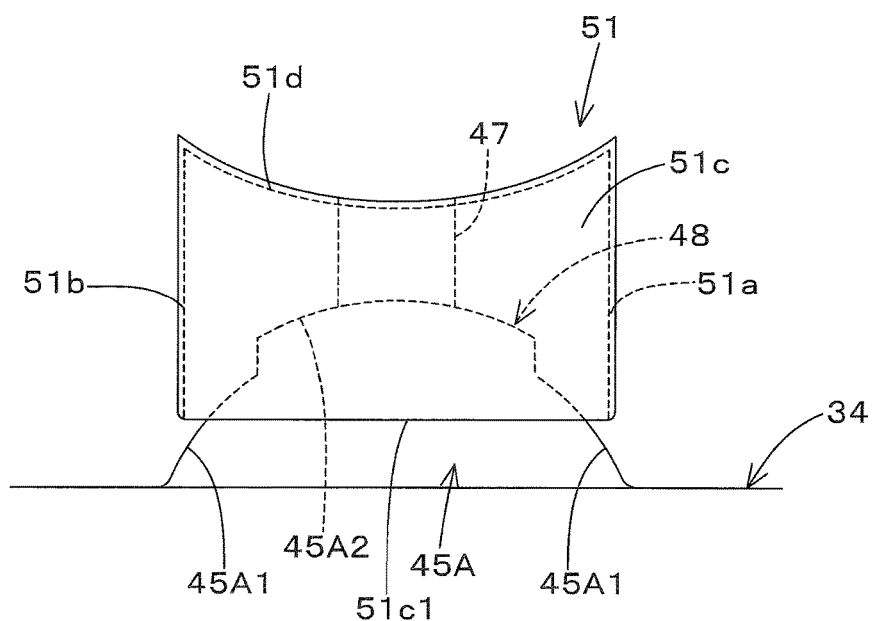
FIG. 18B is a third explanation showing a relation between the operation tools and the base according to the embodiment.

As shown in FIG. 18A and FIG. 18B, the main operation portion 51 includes the inner wall 51a, the outer wall 51b, the top wall 51c, the upper wall 51d, and a fifteenth wall 51g. As in the first embodiment, the inner wall 51a is disposed on the left side, and the outer wall 51b is disposed on the right side. The top wall 51c connects a standing portion of the inner wall 51a and a standing portion of the outer wall 51b to each other. Thus, the top wall 51c is disposed on one side (a top portion) in a direction perpendicular to the width direction.

The upper wall 51d connects the inner wall 51a, the outer wall 51b, the top wall 51c and the fifteenth wall 51g to each other. The fifteenth wall 51g is disposed on the other side (a side closer to the grip portion 30) in the direction perpendicular to the width direction, and connects the inner wall 51a, the outer wall 51b and the upper wall 51d to each other.

In this manner, the main operation portion 51 is constituted of the inner wall 51a, the outer wall 51b, the top wall 51c, the upper wall 51d and the fifteenth wall 51g and is formed to have a box shape opened at a portion opposed to the upper wall 51d.

In addition, the support member 47 is attached to the upper wall 51d, and the support member 47 is inserted into the insertion inlet 46 of the partially-cylindrical member 48. The support member 47 may be attached to any one of the inner wall 51a, the outer wall 51b, the top wall 51c, the upper wall 51d and the fifteenth wall 51g.

The top wall 5c is overlapped with a part of the eleventh wall 45A of the base 45. To be detailed, regarding the top wall 51c, the end portion 51c1 on a side closer to the installation portion 34 is closer to the installation portion 34 than the partially-cylindrical member 48 of the base 45, and the partially-cylindrical member 48 is overlapped with the top wall 51c in a height direction. In other words, the side portion 51c1 of the top wall 51c is located on a position lower than the standing portions 45A2, 45B2, 45C2 and 45D2 in a side view.

In a modified example shown in FIG. 18A and FIG. 18B, the top wall 51c is overlapped with the partially-cylindrical member 48 even when the main operation portion 51 is swung. To be detailed, a part of the top wall 51c is overlapped with the partially-cylindrical member 48 under a state where the main operation portion 51 is swung to the leftmost side, and a part of the top wall 51c is overlapped with the partially-cylindrical member 48 under a state where the main operation portion 51 is swung to the rightmost side.

In the modified example, the inner wall 51a is positioned on a left side of the partially-cylindrical member 48, the outer wall 51b is positioned on a right side of the partially-cylindrical member 48, and the fifteenth wall 51g is positioned on a side below the partially-cylindrical member 48 (a side closer to the grip portion 30). That is, at least the partially-cylindrical member 48 is surrounded by the inner wall 51a, the outer wall 51b, the top wall 51c and the fifteenth wall 51g.

Each of end portions (sides closer to the installation portion 34) of the outer wall 51b and the fifteenth wall 51g is closer to the installation portion 34 than the partially-cylindrical member 48 of the base 45, and the partially-cylindrical member 48 is overlapped with the top wall 51c in a height direction.

In this manner, according to the displacement switch 40A, at least the top wall 51c is overlapped with the base 45, and thus the displacement switch 40A blocks outside unnecessary substance (for example, soil, sand, water and mud) and can further suppress intrusion of the outside unnecessary substance into the partially-cylindrical member 48.

Figure 19A:
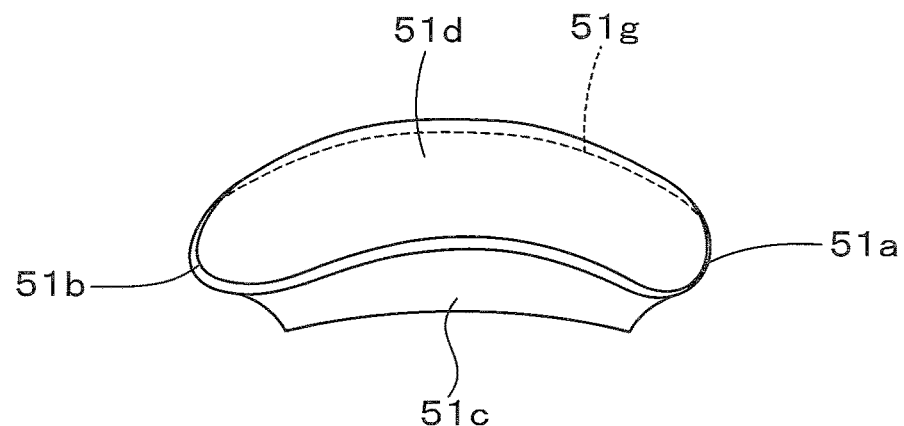
FIG. 19A is a view showing a modified example of a switch according to the embodiment.
Figure 19B:
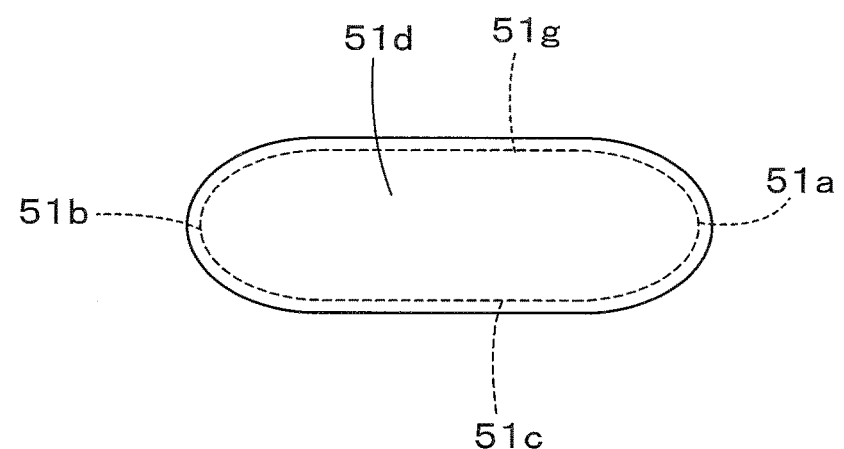
FIG. 19B is a cross-sectional view of the switch in FIG. 19A.

The displacement switch 40A may have a shape shown in FIG. 19A and FIG. 19B. As shown in FIG. 19A and FIG. 19B, the displacement switch 40A includes an operation surface having a circular arc shape at least in a plane view. The inner wall 51a is a wall having a circular arc shape and is positioned on the left side, and the outer wall 51b is a wall having a circular arc shape and is positioned on the right side. The top wall 51c is a wall connecting the inner wall 51a and the outer wall 51b to each other. The fifteenth wall 51g is a wall connecting the inner wall 51a and the outer wall 51b to each other at a position apart from the top wall 51c. The upper wall 51d is a wall connecting the inner wall 51a, the outer wall 51b, the top wall 51c and the fifteenth wall 51g to each other.

According to an embodiment of the present invention, the installation portion 34 is arranged along a direction similar to the track K of a thumb, that is, along a direction facing outward and slightly obliquely upward, and thus the operation tool 40 disposed on the head portion 31 can be very easily operated.

In the above description, the embodiments of the present invention has been explained. However, all the features of the embodiments disclosed in this application should be considered just as examples, and the embodiment does not restrict the present invention accordingly. A scope of the present invention is shown not in the above-described embodiments but in claims, and is intended to include all modifications within and equivalent to a scope of the claims.

In the embodiments described above, the displacement switch is explained exemplifying the seesaw switch capable of being freely swung in the width direction. The displacement switch is not limited to the seesaw switch, and may be constituted of a slide switch capable of being freely slid in the width direction. Employing the slide switch, the seesaw switch has to be replaced by the slide switch, and the configuration swinging in the width direction has to be replaced by the configuration sliding in the width direction. Employing two or more displacement switches, the seesaw switch and the slide switch may be employed together.

The operation tool 40 is not limited to the embodiments described above. For example, only the displacement switch 40A may be employed as the operation tool 40, only the push switch 40B may be employed as the operation tool 40, and only the displacement switch 40C may be employed as the operation tool 40. The displacement switches 40A, 40C and 40D and the push switches 40B and 40E may be arbitrarily combined and arranged on the installation portion 34, and other switches may be arranged on the installation portion 34. In this manner, in installation of the operation tools such as the switches, the heights of the upper operation tool located on an upper side and the lower operation tool located on a lower side may be different from each other, and the upper operation tool may be disposed on the base 45. A displacement switch capable of being freely swung may be disposed on a right side of the installation portion 34. As shown in FIG. 4, FIG. 5 and the like, the push switch 40D may be disposed on a back surface side of the head portion 31.

In the embodiments described above, the displacement switch (the operation tool) 40A is disposed on the base 45. For example, the displacement switch (the operation tool) 40A may be a switch including the base 45. That is, the operation tool 40 may include the main operation portion 51, the subordinate operation portion 52 and the base 45, or may include the main operation portion 51 and the base 45. In that case, the base 45 may internally include the axial shaft 50, the support member 47 may be attached to the axial shaft 50, and thus the main operation portion 51 and the others may be configured to be capable of being swung.

The displacement switch (the operation tool) 40A in the embodiments described above may be not only disposed on the operation device 25 (the installation portion 34) in the embodiments described above but also attached to an operation device different from the operation device 25 (the installation portion 34) described above or to other components.

Preferred embodiments of the invention are specified in the following paragraphs:

1. In a first aspect according to an embodiment of the present invention, an operation device includes: a grip portion; and a head portion disposed on the grip portion, the head portion including: an operation tool configured to be operable; and an installation portion for installation of the operation tool, the installation portion being inclined lowering on a near side than on a far side opposed to the near side from the far side toward the near side, and being inclined to be closer to the far side on an inner side than on an outer side in a width direction from the near side toward the far side.

According to the first aspect according to an embodiment of the present invention, the installation portion is inclined lowering on a near side than on a far side opposed to the near side from the far side toward the near side, and is inclined to be closer to the far side on an inner side than on an outer side in a width direction from the near side toward the far side. Accordingly, a pad of a thumb can be easily moved along the installation portion under a state where an operator grasps the grip portion with a hand and stretches the thumb of the hand toward a head portion, and thus the operation tools arranged on the installation portion can be easily operated by the thumb.

2. In a second aspect according to an embodiment of the present invention, the installation portion includes: a first center portion located on the near side in the width direction; and a second center portion located on the far side in the width direction, the second center portion being located outward with respect to the first center portion in the width direction.

According to the second aspect according to an embodiment of the present invention, the installation portion includes: a first center portion located on the near side in the width direction; and a second center portion located on the far side in the width direction, the second center portion being located outward with respect to the first center portion in the width direction. That is, the installation portion is inclined toward the inner side in the width direction in a front view, and thus the pad of the thumb can be easily moved along the installation portion.

3. In a third aspect according to an embodiment of the present invention, the operation tool is a pair of push switches, one of the push switches being located right in the installation portion, the other one of the push switches being located left in the installation portion.

According to the third aspect according to an embodiment of the present invention, a position of the push switch can be easily set on a track of the moving of the thumb, and thus the push switch can be easily operated.

4. In a fourth aspect according to an embodiment of the present invention, the operation tool is a displacement switch to be freely swung about a vertical axis or to be freely slid in the width direction.

According to the fourth aspect according to an embodiment of the present invention, a position of the displacement switch can be easily set on a track of the moving of the thumb, and thus the displacement switch can be easily operated.

5. In a fifth aspect according to an embodiment of the present invention, the displacement switch includes: a main operation portion extending in the width direction; and a subordinate operation portion extending to the grip portion.

According to the fifth aspect according to an embodiment of the present invention, the operation tool can be operated by putting the thumb on the main operation portion when the operator has a normal or large hand, and can be operated by putting the thumb on the subordinate operation portion when the operator has a small hand. That is, the operation tool can be easily operated even when the operator has the small hand.

6. In a sixth aspect according to an embodiment of the present invention, an operation device includes: a grip portion; and a head portion disposed on the grip portion, the head portion including: at least two operation tools; and an installation portion for installation of the operation tools, one of the operation tools serving as a lower operation tool disposed on a side of the grip portion, another operation tool serving as an upper operation tool disposed on a side of a top portion of the head portion, wherein a first operation detecting position for the lower operation tool is located on a side closer to the installation portion than a second operation detecting portion for the upper operation tool.

According to the sixth aspect according to an embodiment of the present invention, the first operation detecting position for the lower operation tool is located on a side closer to the installation portion than a second operation detecting portion for the upper operation tool. Thus, under a state where the operation tools are arranged along the vertical direction, an error operation to the lower operation tool can be prevented, the error operation being caused when the upper operation tool is operated.

7. In a seventh aspect according to an embodiment of the present invention, an operation device includes: a grip portion; and a head portion disposed on the grip portion, the head portion including: at least two operation tools; and an installation portion for installation of the operation tools, one of the operation tools serving as a lower operation tool disposed on a side of the grip portion, another operation tool serving as an upper operation tool disposed on a side of a top portion of the head portion; a second operation surface included in the upper operation tool; and a first operation surface included in the lower operation tool, the first operation surface being located on a side closer to the installation portion than the second operation surface.

According to the seventh aspect according to an embodiment of the present invention, the first operation surface included in the lower operation tool is located on a side closer to the installation portion than the second operation surface included in the upper operation tool. Thus, under a state where the operation tools are arranged along the vertical direction, an error operation to the lower operation tool can be prevented, the error operation being caused when the upper operation tool is operated. In particular, regarding the upper operation tool and the lower operation tool, positions of the first operation surface and the second operation surface are different from each other, and thus positions of the operations to the operation tools are visually different from each other. In this manner, the error operations to the upper operation tool and the lower operation tool can be prevented more certainly.

8. In an eighth aspect according to an embodiment of the present invention, the installation portion forms a cover portion covering an outer circumference of the lower operation tool.

According to the eighth aspect according to an embodiment of the present invention, the cover portion can prevent the unnecessary substance (for example, soil, sand, water and mud) from splashing to the lower operation portion to enter an inside of the switch.

9. In a ninth aspect according to an embodiment of the present invention, the upper operation tool is a displacement switch to be freely swung about a vertical axis or to be freely slid in the width direction, and the lower operation tool is a pair of push switches.

According to the ninth aspect according to an embodiment of the present invention, the error operation to the push switch can be prevented in the operation to the displacement switch under a state where the upper operation tool is the displacement switch and the lower operation tool is the push switch.

10. In a tenth aspect according to an embodiment of the present invention, an operation device includes: a grip portion; and a head portion disposed on the grip portion, the head portion including at least two operation tools arranged on both sides of an extension line formed by extending an axis of the grip portion, and the operation tools locating a center portion between the operation tools on an inner side with respect to the extension line in a width direction and inclining a center line passing through the center portion toward the inner side with respect to the extension line in the width direction.

According to the tenth aspect according to an embodiment of the present invention, one of the at least two operation tools can be easily positioned on a portion overlapped with the thumb in a posture (a vertical posture) where an operator grasps the grip portion with a hand and stretches the thumb of the hand toward a head portion. In addition, when the thumb is moved from the vertical posture toward the inner side in the width direction, a position of the other one of the operation tools can be easily set on a track of the moving of the thumb. In other words, the operation tools can be easily arranged within a range of the moving of the thumb, and thus that configuration improves operability.

11. In an eleventh aspect according to an embodiment of the present invention, an operation device includes: a grip portion; a head portion disposed on the grip portion, the head portion including an operation tool arranged extending across both sides of an extension line formed by extending an axis of the grip portion, and the operation tools locating a center portion of the operation tool on an inner side with respect to the extension line in a width direction and inclining a center line passing through the center portion toward the inner side with respect to the extension line in the width direction.

According to the eleventh aspect according to an embodiment of the present invention, an outer side of the operation tool in the width direction can be easily positioned on the portion overlapped with the thumb in the posture (the vertical posture) where an operator grasps the grip portion with a hand and stretches the thumb of the hand toward the installation portion. In addition, when the thumb is moved from the vertical posture toward the inner side in the width direction, a position of the operation tool can be easily set on a track of the moving of the thumb. In other words, the outer side of and the inner side of the operation tool can be easily arranged within a range of the moving of the thumb, and thus that configuration improves operability.

12. In a twelfth aspect according to an embodiment of the present invention, the operation device according to the tenth aspect or the eleventh aspect includes an installation portion to install the operation tool on the head portion, wherein a straight line extending from a side of a top portion of the installation portion to a side of the grip portion is a vertical line.

According to the twelfth aspect according to an embodiment of the present invention, a straight line extending from a side of a top portion of the installation portion to a side of the grip portion is a substantially vertical line, and thus the operation tool can be easily operated. That is, the operation tool of the installation portion can be easily operated even when the operation tool is operated with the thumb vertically raised.

13. In a thirteenth aspect according to an embodiment of the present invention, the head portion includes an installation portion for installation of the operation tool, the installation portion being inclined lowering on a near side than on a far side opposed to the near side from the far side toward the near side.

According to the thirteenth aspect according to an embodiment of the invention, the installation portion is inclined lowering on a near side than on a far side opposed to the near side from the far side toward the near side. Accordingly, the operation portion can be operated by the thumb slightly extending from the near side toward the far side without vertically raising the thumb, and thus that configuration more improves operability of the operation portion.

14. In a fourteenth aspect according to an embodiment of the present invention, an operation device includes: a grip portion having a back surface; a head portion disposed on the grip portion, the head portion including an operation tool; and a guide portion to guide grasping of the grip portion, the guide portion being formed on the back surface of the grip portion to be curved gradually shifting outward along a direction from a lower side of the grip portion to an upper side of the grip portion in a width direction and gradually shifting inward along a direction from an intermediate portion of the grip portion to the upper side in the width direction.

According to the fourteenth aspect according to an embodiment of the present invention, the guide portion is formed on the back surface of the grip portion to be curved gradually shifting outward along a direction from a lower side of the grip portion to an upper side of the grip portion in a width direction and gradually shifting inward along a direction from an intermediate portion of the grip portion to the upper side in the width direction. In this manner, the fingers of the hand can be easily arranged on and along the guide portion in the vicinity of the second joints under a state where the operator grasps the grip portion.

15. In a fifteenth aspect according to an embodiment of the present invention, the grip portion, in a cross-sectional view, has an elliptic shape formed gradually shifting outward from a near side to the side of the back surface and gradually shifting inward along a direction from an intermediate portion of the grip portion to the side of the back surface.

According to the fifteenth aspect according to an embodiment of the present invention, the grip portion, has an elliptic shape formed gradually shifting outward from a near side to the side of the back surface and gradually shifting inward along a direction from an intermediate portion of the grip portion to the side of the back surface. In this manner, a position of the hand is set with respect to the grip portion, and thus a position of the thumb can be easily fixed with respect to the head portion.

16. In a sixteenth aspect of the grip portion, the grip portion, in a front view, includes: a first outline gradually shifting inward and then gradually shifting outward along a direction from a lower portion of the grip portion to an upper side; and a second outline gradually shifting outward and then gradually shifting inward along the direction from the lower portion of the grip portion to the upper side, the second outline being curved more broadly than the first outline.

According to the sixteenth aspect according to an embodiment of the present invention, the second outline being curved more broadly than the first outline. In this manner, an outer side of the grip portion can be more easily fitted to a palm of the hand, and thus the position of the hand can be easily fixed with respect to the grip portion.

7. In a seventeenth aspect according to an embodiment of the present invention, the grip portion is inclined gradually shifting toward the back surface along the direction from a lower portion of the grip portion to an upper side.

According to the seventeenth aspect according to an embodiment of the present invention, the grip portion is inclined gradually shifting toward the back surface along the direction from a lower portion of the grip portion to an upper side. In this manner, the operator can easily grasp the grip portion.

18. In an eighteenth aspect according to an embodiment of the present invention, a displacement switch capable of being swung about a vertical axis or capable of being slid in a width direction, includes: a main operation portion extending along the width direction; and a subordinate operation portion extending from the main operation portion along a direction perpendicular to the width direction.

According to the eighteenth and twenty-sixth aspects according to an embodiment of the present invention, the operation tool can be operated by putting the thumb on the main operation portion when the operator has a normal or large hand, and can be operated by putting the thumb on the subordinate operation portion when the operator has a small hand. That is, the operation tool can be easily operated even when the operator has the small hand.

19. In a nineteenth aspect according to an embodiment of the present invention, the main operation portion includes: a first wall disposed on one side of the width direction; a second wall disposed on the other side of the width direction; a third wall connecting a first standing portion and a second standing portion to each other, the first standing portion being included in the first wall, the second standing portion being included in the second wall, and a fourth wall connecting the first wall, the second wall and the third wall to each other, the fourth wall including: an operation surface.

According to the nineteenth and twenty-seventh aspects according to an embodiment of the present invention, the main operation portion includes the first wall, the second wall, the third wall and the fourth wall. In this manner, the main operation portion can be firmly composed.

20. In a twentieth aspect according to an embodiment of the present invention, the main operation portion includes: a first connection wall connecting the first wall and the fourth wall to each other and being inclined toward the subordinate operation portion; and a second connection wall disposed opposite to the first connection wall, the second connection wall connecting the first wall and the fourth wall to each other and being inclined toward the subordinate operation portion.

According to the twentieth and twenty-eighth aspects according to an embodiment of the present invention, the main operation portion includes: the first connection wall being inclined toward the subordinate operation portion; and the second connection wall being inclined toward the subordinate operation portion. In this manner, the inclined surfaces can provide a large space between the main operation portion and the subordinate operation portion. In other words, a space can be provided around the subordinate operation portion, and thus the operation tools such as the switches can be arranged in the space.

21. In a twenty-first aspect according to an embodiment of the present invention, the subordinate operation portion includes: an escape portion formed on a lower portion of the subordinate operation part, the escape portion escaping from interference with an operation tool in the swinging about the vertical axis or in the sliding in the width direction, the operation tool being arranged around the subordinate operation portion.

According to the twenty-first and twenty-ninth aspects according to an embodiment of the present invention, the subordinate operation portion includes the escape portion. In this manner, the displacement switch can be overlapped with the operation tools in the operation. Accordingly, the operation tools can be arranged as close to the subordinate operation portion as possible, and thus a size of the installation portion (the head portion) can be reduced.

22. In a twenty-second aspect according to an embodiment of the present invention, the displacement switch according to the nineteenth aspect or the twentieth aspect, includes a base mounting the main operation portion, the base being overlapped with the third wall of the main operation portion.

According to the twenty-second and thirtieth aspects according to an embodiment of the present invention, the base is overlapped with the third wall of the main operation portion. In this manner, the third wall of the main operation portion blocks the outside substance (for example, soil, sand, water and mud), and thus the outside substance such as a small clod can be prevented from entering the inside of the base.

23. In a twenty-third aspect according to an embodiment of the present invention, the displacement switch according to the twenty-second aspect, includes a support member to support the main operation portion to be capable of freely swinging the main operation portion, wherein the base includes a partially-cylindrical member providing an insertion inlet for insertion of the support member, the partially-cylindrical member being overlapped with the third wall.

According to the twenty-third and thirty-first aspects according to an embodiment of the present invention, the third wall is overlapped with the partially-cylindrical member providing the insertion inlet for insertion of the support member. In this manner, the third wall of the main operation portion blocks the outside substance (for example, soil, sand, water and mud), and thus the outside substance such as soil can be prevented more certainly from entering the insertion inlet through the third wall and the partially-cylindrical member.

24. In a twenty-fourth aspect according to an embodiment of the present invention, a displacement switch includes: a first wall disposed on one side of a width direction; a second wall disposed on the other side of the width direction; a third wall connecting a first standing portion and a second standing portion to each other, the first standing portion being included in the first wall, the second standing portion being included in the second wall; a fourth wall connecting the first wall, the second wall and the third wall to each other, the fourth wall including: an operation surface; a support member disposed on at least one of the first wall, the second wall, the third wall and the fourth wall, the support member being capable of freely swinging; and a base including an insertion inlet for insertion of the support member, the base being overlapped with the third wall.

According to the twenty-fourth and thirty-third aspects according to an embodiment of the present invention, the base is overlapped with the third wall included in the displacement switch. In this manner, the third wall of the main operation portion blocks the outside substance (for example, soil, sand, water and mud), and thus the outside substance can be prevented from entering the inside of the base.

25. In a twenty-fifth aspect according to an embodiment of the present invention, the base includes a partially-cylindrical member providing the insertion inlet, the partially-cylindrical member being overlapped with the third wall.

According to the twenty-fifth and thirty-fourth aspects according to an embodiment of the present invention, the third wall is overlapped with the partially-cylindrical member providing the insertion inlet for insertion of the support member. In this manner, the third wall blocks the outside substance (for example, soil, sand, water and mud), and thus the outside substance can be prevented more certainly from entering the insertion inlet through the third wall and the partially-cylindrical member.

26. In a twenty-sixth aspect according to an embodiment of the present invention, an operation device includes: a grip portion; a head portion disposed on the grip portion; and a displacement switch disposed on the head portion, the displacement switch being capable of being swung about a vertical axis or capable of being slid in a width direction, the displacement switch including: a main operation portion extending along the width direction; and a subordinate operation portion extending from the main operation portion along a direction perpendicular to the width direction.

27. In a twenty-seventh aspect according to an embodiment of the present invention, the main operation portion includes: a first wall disposed on one side of the width direction; a second wall disposed on the other side of the width direction; a third wall connecting a first standing portion and a second standing portion to each other, the first standing portion being included in the first wall, the second standing portion being included in the second wall, and a fourth wall connecting the first wall, the second wall and the third wall to each other, the fourth wall including: an operation surface.

28. In a twenty-eighth aspect according to an embodiment of the present invention, the main operation portion includes: a first connection wall connecting the first wall and the fourth wall to each other and being inclined toward the subordinate operation portion; and a second connection wall disposed opposite to the first connection wall, the second connection wall connecting the first wall and the fourth wall to each other and being inclined toward the subordinate operation portion.

29. In a twenty-ninth aspect according to an embodiment of the present invention, the operation device according to any one of the twenty-sixth aspect to the twenty-eighth aspect, includes operation tools disposed on both sides of the subordinate operation portion, wherein the subordinate operation portion includes: an escape portion formed on a lower portion of the subordinate operation part, the escape portion escaping from interference with an operation tool in the swinging about the vertical axis or in the sliding in the width direction, the operation tool being arranged around the subordinate operation portion.

30. In a thirtieth aspect according to an embodiment of the present invention, the operation device according to the twenty-seventh aspect or the twenty-eighth aspect, includes a base mounting the main operation portion, the base being overlapped with the third wall of the main operation portion.

31. In a thirty-first aspect according to an embodiment of the present invention, the operation device according to the thirtieth aspect, includes a support member to support the displacement switch to be capable of freely swinging the displacement switch, wherein the base includes a partially-cylindrical member providing an insertion inlet for insertion of the support member, the partially-cylindrical member being overlapped with the third wall.

32. In a thirty-second aspect according to an embodiment of the present invention, the operation device according to any one of the twenty-fourth aspect to the twenty-eighth aspect, includes: another displacement switch disposed on a side closer to the grip portion than the subordinate operation portion; and a concave portion allowing sliding of a finger, the concave portion being disposed on a portion where the another displacement switch is overlapped with a center line extending from the subordinate operation portion toward the grip portion, the portion being on the another displacement switch.

According to the thirty-second aspect according to an embodiment of the present invention, the displacement switch arranged on the side of the top portion can be operated by the thumb even when the displacement switches are arranged adjacent to each other on a side of the top portion and on a side of the grip portion.

33. In a thirty-third aspect according to an embodiment of the present invention, an operation device includes: a grip portion; a head portion disposed on the grip portion; and a displacement switch disposed on the head portion, the displacement switch being capable of being swung about a vertical axis or capable of being slid in a width direction, the displacement switch including: a first wall disposed on one side of a width direction; a second wall disposed on the other side of the width direction; a third wall connecting a first standing portion and a second standing portion to each other, the first standing portion being included in the first wall, the second standing portion being included in the second wall, and a fourth wall connecting the first wall, the second wall and the third wall to each other, the fourth wall including: an operation surface; a support member disposed on at least one of the first wall, the second wall, the third wall and the fourth wall, the support member being capable of freely swinging; and a base including an insertion inlet for insertion of the support member, the base being overlapped with the third wall.

34. In a thirty-fourth aspect according to an embodiment of the present invention, the base includes a partially-cylindrical member providing the insertion inlet, the partially-cylindrical member being overlapped with the third wall.

What is claimed is:

1. A displacement switch comprising:
    a main operation portion having a hollow shape that comprises:
        a top surface via which the displacement switch is operated; and
        a side surface connected to the top surface to define the hollow shape;
    a support member connected to the main operation portion and swingable around a swing axis together with the main operation portion; and
    a base including a peripheral wall surrounding an insertion inlet into which the support member is inserted,
    wherein the main operation portion covers the insertion inlet such that the side surface surrounds an outer peripheral surface of the peripheral wall.

2. The displacement switch according to claim 1, wherein
    the peripheral wall includes a peripheral wall top surface opposite to the top surface of the main operation portion in a height direction of the displacement switch, and
    the insertion inlet is hollowed from the peripheral wall top surface.

3. The displacement switch according to claim 2, wherein
the side surface has a top edge connected to the operation surface and a bottom edge opposite to the top edge in the height direction, and
the insertion inlet is provided between the top edge and the bottom edge in the height direction.

4. An operation device comprising:
a grip portion;
a head portion disposed on the grip portion;
a displacement switch disposed on the head portion, the displacement switch being swingable about a swing axis or slidable in a width direction of the displacement switch, the displacement switch comprising:
  a main operation portion having a hollow shape that comprises:
    a top surface via which the displacement switch is operated; and
    a side surface connected to the top surface to define the hollow shape;
a support member connected to the main operation portion to support the main operation portion to move together with the main operation portion; and
a base including a peripheral wall surrounding an insertion inlet into which the support member is inserted,
wherein the main operation portion covers the insertion inlet such that the side surface surrounds an outer peripheral surface of the peripheral wall.

5. The operation device according to claim 4, wherein
the head portion includes:
  at least two operation tools; and
  an installation portion for installation of the operation tools, one of the operation tools serving as a lower operation tool disposed on a side of the grip portion, another of the operation tools serving as an upper operation tool disposed on a side of a top portion of the head portion, and
a first operation detecting position for the lower operation tool is located on a side closer to the installation portion than a second operation detecting portion for the upper operation tool.

6. The operation device according to claim 4, wherein
the head portion includes:
  at least two operation tools; and
  an installation portion for installation of the operation tools, one of the operation tools serving as a lower operation tool disposed on a side of the grip portion, another operation tool serving as an upper operation tool disposed on a side of a top portion of the head portion,
the upper operation tool includes a second operation surface, and
the lower operation tool includes a first operation surface located on a side closer to the installation portion than the second operation surface.

7. The operation device according to claim 4, wherein
the head portion includes:
  an operation tool to be operated; and
  an installation portion for installation of the operation tool, the installation portion being inclined lowering on a near side than on a far side opposed to the near side from the far side toward the near side, and being inclined to be closer to the far side on an inner side than on an outer side in the width direction from the near side toward the far side.

8. The operation device according to claim 4, wherein
the head portion includes at least two operation tools arranged on both sides of an extension line formed by extending an axis of the grip portion, and the operation tools locating a center portion between the operation tools on an inner side with respect to the extension line in the width direction and inclining a center line passing through the center portion toward the inner side with respect to the extension line in the width direction.

9. The operation device according to claim 4, wherein
a grip portion has a back surface,
the head portion includes an operation tool, and
  a guide portion is formed on the back surface of the grip portion to be curved gradually shifting outward along a direction from a lower side of the grip portion to an upper side of the grip portion in the width direction and gradually shifting inward along a direction from an intermediate portion of the grip portion to the upper side in the width direction, the guide portion being to guide gripping of the grip portion.

10. The displacement switch according to claim 4, wherein
the peripheral wall includes a peripheral wall top surface opposite to the top surface of the main operation portion in a height direction of the displacement switch, and
the insertion inlet is hollowed from the top surface.

11. The displacement switch according to claim 10, wherein
the side surface has a top edge connected to the operation surface and a bottom edge opposite to the top edge in the height direction, and
the insertion inlet is provided between the top edge and the bottom edge in the height direction.

12. An operation device comprising:
a grip portion;
a head portion disposed on the grip portion;
a displacement switch disposed on the head portion, the displacement switch being swingable about a swing axis or slidable in a width direction of the displacement switch, the swing axis being substantially perpendicular to the width direction, the displacement switch having a T-shaped configuration including:
  a main operation portion extending along the width direction, the main operation portion including an operation surface via which the displacement switch is operated; and
  a subordinate operation portion extending from the main operation portion along a direction perpendicular to the width direction to move integrally with the main operation portion;
a base mounting the main operation portion, the base overlapping the third wall of the main operation portion viewed in a first direction perpendicular to the third wall; and
a support member to support the main operation portion and the subordinate operation portion swingably around the swing axis together with the main operation portion, wherein
the base includes a peripheral wall surrounding an insertion inlet into which the support member is to be inserted, the main operation portion covering the insertion inlet such that the first wall, the second wall, and the third wall surrounds the peripheral wall.

13. An operation device comprising:
a grip portion;
a head portion disposed on the grip portion;
a displacement switch disposed on the head portion, the displacement switch being swingable about a swing axis or slidable in a width direction of the displacement switch, the swing axis being substantially perpendicular to the width direction, the displacement switch having a T-shaped configuration including:
- a main operation portion extending along the width direction, the main operation portion including an operation surface via which the displacement switch is operated; and
- a subordinate operation portion extending from the main operation portion along a direction perpendicular to the width direction to move integrally with the main operation portion;

an additional displacement switch disposed on a side closer to the grip portion than the subordinate operation portion, the additional displacement switch being different from the displacement switch; and a concave portion allowing sliding of a finger, the concave portion being disposed on a portion where the additional displacement switch overlaps a center line extending from the subordinate operation portion toward the grip portion, the portion being on the additional displacement switch.

14. An operation device comprising:
a grip portion;
a head portion disposed on the grip portion; and
a displacement switch disposed on the head portion, the displacement switch being swingable about a swing axis or slidable in a width direction of the displacement switch, the swing axis being substantially perpendicular to the width direction, the displacement switch having a T-shaped configuration including:
- a main operation portion extending along the width direction, the main operation portion including an operation surface via which the displacement switch is operated; and
- a subordinate operation portion extending from the main operation portion along a direction perpendicular to the width direction to move integrally with the main operation portion, wherein the head portion includes:
- at least two operation tools; and
- an installation portion for installation of the operation tools, one of the operation tools serving as a lower operation tool disposed on a side of the grip portion, another of the operation tools serving as an upper operation tool disposed on a side of a top portion of the head portion, and a first operation detecting position for the lower operation tool is located on a side closer to the installation portion than a second operation detecting portion for the upper operation tool.

15. The operation device according to claim 14, wherein the installation portion forms a cover portion covering an outer circumference of the lower operation tool.

16. The operation device according to claim 14, wherein the upper operation tool is the displacement switch, and the lower operation tool is a pair of push switches.

17. An operation device comprising:
a grip portion;
a head portion disposed on the grip portion; and
a displacement switch disposed on the head portion, the displacement switch being swingable about a swing axis or slidable in a width direction of the displacement switch, the swing axis being substantially perpendicular to the width direction, the displacement switch having a T-shaped configuration including:
- a main operation portion extending along the width direction, the main operation portion including an operation surface via which the displacement switch is operated; and
- a subordinate operation portion extending from the main operation portion along a direction perpendicular to the width direction to move integrally with the main operation portion, wherein the head portion includes:
- at least two operation tools; and
- an installation portion for installation of the operation tools, one of the operation tools serving as a lower operation tool disposed on a side of the grip portion, another operation tool serving as an upper operation tool disposed on a side of a top portion of the head portion, the upper operation tool includes a second operation surface, and the lower operation tool includes a first operation surface located on a side closer to the installation portion than the second operation surface.

18. The operation device according to claim 17, wherein the installation portion forms a cover portion covering an outer circumference of the lower operation tool.

19. The operation device according to claim 17, wherein the upper operation tool is the displacement switch, and the lower operation tool is a pair of push switches.

* * * * *